United States Patent
Kurata et al.

(10) Patent No.: US 9,303,123 B2
(45) Date of Patent: Apr. 5, 2016

(54) ENERGY-RAY-CURABLE ELASTOMER COMPOSITION, MATERIAL FOR GASKET, GASKET, AND HARD DISK DEVICE

(75) Inventors: Toshihiko Kurata, Kanagawa (JP); Naoyuki Ohmori, Kanagawa (JP)

(73) Assignee: BRIDGESTONE CORPORATION, Tokyo (JP)

( * ) Notice: Subject to any disclaimer, the term of this patent is extended or adjusted under 35 U.S.C. 154(b) by 24 days.

(21) Appl. No.: 13/266,422

(22) PCT Filed: Apr. 27, 2010

(86) PCT No.: PCT/JP2010/057460
§ 371 (c)(1),
(2), (4) Date: Oct. 26, 2011

(87) PCT Pub. No.: WO2010/126040
PCT Pub. Date: Nov. 4, 2010

(65) Prior Publication Data
US 2012/0041096 A1  Feb. 16, 2012

(30) Foreign Application Priority Data

Apr. 27, 2009 (JP) ................................ 2009-108158
Apr. 30, 2009 (JP) ................................ 2009-111429

(51) Int. Cl.
*C08G 75/04* (2006.01)
*C09K 3/10* (2006.01)
*C08K 5/37* (2006.01)

(52) U.S. Cl.
CPC . *C08G 75/04* (2013.01); *C08K 5/37* (2013.01); *C09K 3/1012* (2013.01); *C08L 2312/06* (2013.01); *C09K 2003/1062* (2013.01)

(58) Field of Classification Search
CPC ........ C08G 75/04; C08K 5/37; C09K 3/1012; C09K 2003/1062; C08L 2312/06
USPC .......... 522/178, 180, 182, 113, 127, 114, 118
See application file for complete search history.

(56) References Cited

U.S. PATENT DOCUMENTS

| 4,808,638 | A |   | 2/1989 | Steinkraus et al. |
| 5,047,576 | A |   | 9/1991 | Takenosita et al. |
| 5,236,967 | A | * | 8/1993 | Ohkawa et al. ................. 522/32 |
| 5,411,776 | A | * | 5/1995 | Schmidt et al. ................. 428/34 |
| 2002/0052428 | A1 |   | 5/2002 | Arai |
| 2007/0021521 | A1 | * | 1/2007 | Cheng et al. ....................... 522/1 |
| 2010/0105795 | A1 | * | 4/2010 | Maandi et al. .................. 522/48 |
| 2011/0281967 | A1 |   | 11/2011 | Krawiec |
| 2011/0313076 | A1 | * | 12/2011 | Kurata ............................ 522/96 |

FOREIGN PATENT DOCUMENTS

| EP | 0 810 251 A2 | 12/1997 |
| JP | 63-235332 A | 9/1988 |
| JP | 63-238132 A | 10/1988 |
| JP | 2-251533 A | 10/1990 |
| JP | 03-54226 A | 3/1991 |
| JP | 10-60114 A | 3/1998 |
| JP | 2000-504435 A | 4/2000 |
| JP | 2004-107450 A | 4/2004 |
| JP | 2006291148 A | 10/2006 |
| JP | 2008025648 A | 2/2008 |
| JP | 2009-503143 A | 1/2009 |
| JP | 2009001654 A | 1/2009 |
| JP | 2012516915 A | 7/2012 |
| WO | 9951653 A1 | 10/1999 |
| WO | 2010/071171 A1 | 6/2010 |

* cited by examiner

*Primary Examiner* — Sanza McClendon
(74) *Attorney, Agent, or Firm* — Sughrue Mion, PLLC

(57) ABSTRACT

Provided is an energy ray-curable elastomer composition which can increase the inter-crosslinking point molecular weight without changing the kind of an energy ray-curable compound before cured and which provides an oligomer-cured substance having a braking elongation compatible with a processability, to be specific, an energy ray-curable elastomer composition containing (A) an energy ray-curable compound having a (meth)acryloyl group and (B) a polythiol compound having 2 to 6 mercapto groups in a molecule, wherein a functional group number ratio of the (meth)acryloyl group in the above composition to the mercapto group in the component (B) is 100:0.1 to 100:5n (n is the number of the mercapto group in a molecule of the polythiol compound).

21 Claims, No Drawings

ENERGY-RAY-CURABLE ELASTOMER COMPOSITION, MATERIAL FOR GASKET, GASKET, AND HARD DISK DEVICE

CROSS REFERENCE TO RELATED APPLICATIONS

This application is a National Stage of International Application No. PCT/JP2010/057460, filed on Apr. 27, 2010, which claims priority from Japanese Patent Application Nos. 2009-108158, filed on Apr. 27, 2009, and 2009-111429 filed Apr. 30, 2009, the contents of all of which are incorporated herein by reference in their entirety.

BACKGROUND OF THE INVENTION

The present invention relates to an energy ray-curable elastomer composition, more specifically to an energy ray-curable elastomer composition in which employing of an energy ray-curing system of an ene-thiol base makes it possible to increase the inter-crosslinking point molecular weight without changing the kind of an energy ray-curable compound before cured, preferably an oligomer and which provides an oligomer-cured substance having a braking elongation compatible with a processability.

Further, the present invention relates to a material for a gasket containing the energy ray-curable compound which provides a gasket enhancing a braking elongation without damaging a processability and other necessary physical properties and making it possible to inhibit cracking, breaking and the like from being caused, a gasket comprising a substance obtained by curing the above material for a gasket by an energy ray and a hard disk device prepared by using the above gasket.

RELATED ART

In general, a composition providing so-called rubber characteristics such as a flexibility, a stretching property, an elasticity and the like is called an elastomer, and since it is outstandingly excellent in a fatigue durability against vibration as compared with other high molecular materials, it is applied as a car member such as tires and the like, a sealing member for structures in construction, civil engineering and the like, a packing member such as o rings and the like, a gasket member, an acoustic member such as speakers and the like, a seat member such as key seats for portable phones and the like, a vibration-proof material, various mechanical members and the like.

In the mean time, recently an increase in performances and a reduction in a size are accelerated in HDD (hard disk device) of a computer, and complicated circuits are constituted therein, so that troubles are brought about even by a small amount of dusts. Accordingly, requirement for preventing dusts is growing high in terms of practical use, and it is usually carried out to prevent dusts from coming in by using a gasket.

A method in which a gasket is molded by injecting a thermoplastic elastomer and the like and a method in which a gasket is formed by punching sheets comprising EPDM (ethylene propylene diene rubber), fluorocarbon rubber and the like into prescribed forms and in which they are adhered have so far been employed as a method for producing a gasket of HDD.

On the other hand, a method in which gaskets are produced by coating an optically curable composition for a sealing material on an adherend by means of a dispenser, molding it and then curing it mainly by a UV ray has come to be employed in recent years instead of conventional molding by injection as HDD is decreased in a size or in order to cut facility investment, processing costs and the like (refer to, for example, patent documents 1, 2 and 3). In order to obtain a sufficiently high sealing property of the gasket, a urethane acrylate oligomer is used as a principal component for the above optically curable composition for a sealing material so that a cured substance thereof is provided with a low hardness.

In general, a gasket for HDD comes to be broken in a certain case by compression and elongation which are induced by a change in temperature in a use environment thereof, and it is desired to be improved. A breaking elongation is recommended to be increased in order to improve it, but in a gasket produced by a UV ray-curing system using a UV ray-curable oligomer, it is limited in terms of balance with a handling property and a processability to increase a breaking elongation.

For example, in an elastic substance prepared by using an optically curable composition for a sealing material, an inter-crosslinking point molecular weight has to be enlarged in order to increase a breaking elongation. The urethane acrylate oligomer described above is considered to be increased in a molecular weight in order to enlarge the inter-crosslinking point molecular weight. In the above case, however, the optically curable composition for a sealing material is elevated in a viscosity and reduced unavoidably in a processability, for example, in coating by means of a dispenser, and it is difficult to employ the above method. Further, a method in which oil is blended is considered to be used as a method for increasing the breaking elongation, but contamination by bleeding out is involved therein, and the above method is not satisfactory as well. Accordingly, it has been difficult to control a mechanical characteristic of an elastic substance comprising a substance prepared by curing a seat material composition by irradiation with a UV ray.

On the other hand, an ene-thiol base optically curable resin composition which is a radical polymerization type optically curable resin composition attracts attentions as an optically curable material since it has the advantages that even if a radical is deactivated by oxygen, an active thiyl radical is reproduced, and therefore inhibition of polymerization by oxygen observed in acryl base materials is not brought about; a use amount of a photoinitiator can be reduced; a volume contraction rate in curing is small; it is cured in a short time of several seconds to several minutes since polymerization starts; materials of cured substances having a very high hardness to soft cured substances can be broadly designed; and cured substances having a large thickness of 1 mm or more can be prepared as well (refer to, for example, a non-patent document 1).

Disclosed as the above ene-thiol base optically curable resin composition are, for example, (1) an optically curable resin composition which contains polyene, polythiol and a compound of a specific structure having an aromatic ring and substituted with bromine and in which a mass ratio of the polyene to the polythiol is 49:1 to 1:49 (refer to, for example, a patent document 4) and (2) an ene-thiol base optically curable resin composition which contains a (poly)thiol base monomer comprising a polyene compound and a reaction product of a polyvalent amine compound with a mercapto-carboxylic acid compound (refer to, for example, a patent document 5).

Patent document 1: International Publication No. 96/10594
Patent document 2: Japanese Patent Application Laid-Open No. 2003-7047

Patent document 3: Japanese Patent Application Laid-Open No. 2004-26919

Patent document 4: Japanese Patent No. 4034098

Patent document 5: Japanese Patent Application Laid-Open No. 2007-70417

Non-patent document 1: "Foresight of UV•EB Curing Technology", p. 39 to 50, edited by CMC, 2002

However, the technique disclosed in the patent document 4 is a technique for providing an optically curable resin composition which has a high refractive index and which can control a refractive index at a high accuracy, and nothing is referred to regarding a breaking elongation and a processability of the cured substance (gasket). Also, the technique disclosed in the patent document 5 is a technique for providing a cured substance which is not inhibited by oxygen from being polymerized, can be cured for short time, has less volume contraction, can reduce a use amount of a photoinitiator and is improved in a moisture resistant performance to a large extent, and nothing is referred to regarding a breaking elongation and a processability of the cured substance.

The present invention has been made under the above situations, and an object of the present invention is to provide an energy ray-curable elastomer composition which can increase the inter-crosslinking point molecular weight without changing the kind of an energy ray-curable compound before cured and which provides an oligomer-cured substance having a braking elongation compatible with a processability, a material for a gasket containing the energy ray-curable compound which provides a gasket enhancing a braking elongation without damaging other necessary physical properties and making it possible to inhibit cracking, breaking and the like from being caused, a gasket comprising a substance obtained by curing the above material for a gasket by an energy ray and a hard disk device prepared by using the above gasket.

Intense researches repeated by the present inventors in order to achieve the objects described above have resulted in finding that the objects can be achieved by an energy ray-curable elastomer composition which contains an energy ray-curable compound having a (meth)acryloyl group and a polythiol compound having 2 to 6 mercapto groups and in which a functional group number ratio of the (meth)acryloyl group to the mercapto group falls in a specific range.

Further, they have found that the objects can be achieved by a material for a gasket which contains an energy ray-curable liquid oligomer having a (meth)acryloyl group and a polythiol compound having 2 to 6 mercapto groups so that a functional group number ratio of the (meth)acryloyl group to the mercapto group falls in a specific range and further contains a (meth)acrylate monomer and in which an inter-crosslinking point molecular weight of a substance cured by irradiating the above material with an energy ray falls in a specific range.

The present invention has been completed based on the above knowledge.

That is, the present invention provides the following items [1] to [23].

[1] An energy ray-curable elastomer composition containing (A) an energy ray-curable compound having a (meth)acryloyl group and (B) a polythiol compound having 2 to 6 mercapto groups in a molecule, wherein a functional group number ratio of the (meth) acryloyl group in the above composition to the mercapto group in the component (B) is 100:0.1 to 100:5n, wherein n is the number of the mercapto group in a molecule of the polythiol compound.

[2] The energy ray-curable elastomer composition according to the above item [1], wherein a cured substance obtained by irradiation with an energy ray has an inter-crosslinking point molecular weight of 4,000 to 55,000 which is calculated from an equation of Flory-Rehner.

[3] The energy ray-curable elastomer composition according to the above item [1] or [2], wherein the energy ray-curable compound (A) having a (meth)acryloyl group has at least 2 (meth)acryloyl groups in a molecule.

[4] The energy ray-curable elastomer composition according to the above item [3], wherein the energy ray-curable compound (A) having a (meth)acryloyl group is an energy ray-curable oligomer.

[5] The energy ray-curable elastomer composition according to the above item [4], wherein the energy ray-curable oligomer is at least one selected from urethane base (meth)acrylate oligomers, polyester base (meth)acrylate oligomers, polyether base (meth)acrylate oligomers, epoxy base (meth)acrylate oligomers, conjugate diene polymer base (meth)acrylate oligomers and hydrogenated products hereof.

[6] The energy ray-curable elastomer composition according to any of the above items [1] to [5], wherein the polythiol compound (B) having 2 to 6 mercapto groups in a molecule is β-mercaptopropionic acid ester of polyhydric alcohol having 2 to 6 hydroxyl groups.

[7] The energy ray-curable elastomer composition according to the above item [6], wherein the polyhydric alcohol having 2 to 6 hydroxyl groups is alkanediol having 2 to 20 carbon atoms, poly(oxyalkylene)glycol, glycerol, diglycerol, trimethylolpropane, ditrimethylolpropane, pentaerythritol or dipentaerythritol.

[8] The energy ray-curable elastomer composition according to any of the above items [1] to [7], wherein the energy ray is a UV ray, and (C) a radical photo-polymerization initiator is contained.

[9] The energy ray-curable elastomer composition according to the above item [8], wherein the radical photo-polymerization initiator is an intramolecular cleavage type and/or a hydrogen drawing type.

[10] A material for a gasket containing the energy ray-curable elastomer composition according to the above item [1] and further containing (D) a (meth)acrylate monomer, wherein the component (A) is an energy ray-curable liquid oligomer having a (meth)acryloyl group, and a cured substance obtained by irradiation with an energy ray has an inter-crosslinking point molecular weight Mc falling in a range of 6,000 to 55,000 which is calculated from an equation of Flory-Rehner.

[11] The material for a gasket according to the above item [10], wherein a viscosity at a temperature of 50° C. and a shear rate of 1.0/second is 1 to 10,000 Pa·s.

[12] The material for a gasket according to the above item [10] or [11], wherein a content of the (meth)acrylate monomer (D) is 5 to 40 parts by mass based on 100 parts by mass of the component (A).

[13] The material for a gasket according to any of the above items [10] to [12], wherein a content of the polythiol compound (B) having 2 to 6 mercapto groups in a molecule is 0.5 to 7 parts by mass based on 100 parts by mass of the component (A).

[14] The material for a gasket according to any of the above items [10] to [13], wherein the energy ray-curable liquid oligomer (A) having a (meth)acryloyl group is an oligomer having at least two (meth)acryloyl groups in a molecule.

[15] The material for a gasket according to the above item [14], wherein the energy ray-curable oligomer (A) having a (meth)acryloyl group is at least one selected from urethane base (meth)acrylate oligomers, polyester base (meth)acrylate oligomers, polyether base (meth)acrylate oligomers, epoxy base (meth)acrylate oligomers, conjugate diene polymer base (meth)acrylate oligomers and hydrogenated products hereof.

[16] The material for a gasket according to the above item [15], wherein the energy ray-curable oligomer (A) having a (meth)acryloyl group is a difunctional urethane base (meth) acrylate oligomer having two (meth)acryloyl groups in a molecule.

[17] The material for a gasket according to any of the above items [10] to [16], wherein the polythiol compound (B) having 2 to 6 mercapto groups in a molecule is β-mercaptopropionic acid ester or β-mercaptobutanoic acid ester of polyhydric alcohol having 2 to 6 hydroxyl groups.

[18] The material for a gasket according to the above item [17], wherein the polyhydric alcohol having 2 to 6 hydroxyl groups is alkanediol having 2 to 20 carbon atoms, poly(oxyalkylene)glycol, glycerol, diglycerol, trimethylolpropane, ditrimethylolpropane, pentaerythritol or dipentaerythritol.

[19] The material for a gasket according to any of the above items [10] to [18], wherein the energy ray is a UV ray, and (C) a radical photo-polymerization initiator is contained. the energy ray is a UV ray, and (C) a radical photo-polymerization initiator is contained.

[20] The material for a gasket according to the above item [19], wherein the radical photo-polymerization initiator (C) is an intramolecular cleavage type and/or a hydrogen drawing type.

[21] A gasket prepared by curing the material for a gasket according to any of the above items [10] to [20] by irradiation with an energy ray.

[22] The gasket according to the above item [21], wherein it has a hardness of 5 to 50 degrees measured by means of a type A durometer according to JIS K 6253.

[23] A hard disk device prepared by using the gasket according to the above item [21] or [22].

The energy ray-curable elastomer composition of the present invention provides the following effects.

(1) Employing of an energy ray-curable system of an ene-thiol base makes it possible to increase an inter-crosslinking point molecular weight of the cured substance without changing the kind of the energy ray-curable compound before cured and provide an elastomer-cured substance in which a braking elongation is compatible with a processability.

(2) If the cured substance obtained by irradiation with an energy ray has an inter-crosslinking point molecular weight falling in a range of 4,000 to 55,000, the effect of (1) described above is exerted well.

(3) If the energy ray-curable compound having a (meth)acryloyl group is the compound having at least two (meth)acryloyl groups, preferably the oligomer, the effect of (1) described above is exerted better.

(4) β-Mercaptopropionic acid ester of polyhydric alcohol having 2 to 6 hydroxyl groups is readily available as the polythiol compound and exerts the excellent effect of (1) described above.

(5) The elastomer in which a braking elongation is compatible with a processability can be obtained at a good productivity by irradiation with a UV ray as an energy ray under the presence of a photo-polymerization initiator.

Also, the material of the present invention for a gasket provides the following effects.

(6) Employing an energy ray-curing system of an ene-thiol base makes it possible to increase an inter-crosslinking point molecular weight of the cured substance and provide a gasket which enhances a braking elongation without damaging a processability and other necessary physical properties and which can inhibit cracking, breaking and the like from being caused.

(7) The material for a gasket which has a suited fluidity and a good handling property and which can maintain a gasket form is obtained by controlling a viscosity of the material for a gasket measured on specific conditions in a prescribed range.

(8) If a content of the (meth)acrylate monomer and a content of the polythiol compound fall in prescribed ranges, the effects of (6) and (7) described above are exerted well.

(9) When the energy ray-curable liquid oligomer having a (meth)acryloyl group is an oligomer having at least two (meth)acryloyl groups, particularly a difunctional urethane base (meth)acryloyl oligomer, the effect of (6) described above is exerted better.

(10) β-Mercaptopropionic acid ester of polyhydric alcohol having 2 to 6 hydroxyl groups is readily available as the polythiol compound and exerts the excellent effect of (6) described above.

(11) The gasket in which a braking elongation is compatible with a processability can be obtained at a good productivity by irradiation with a UV ray as an energy ray under the presence of a photo-polymerization initiator.

(12) If the gasket obtained by using the material of the present invention for a gasket has a hardness falling in a prescribed range which is measured on specific conditions, the above gasket exerts good performances as a gasket for HDD.

BEST MODE FOR CARRYING OUT THE INVENTION

The energy ray-curable elastomer composition of the present invention (hereinafter referred to merely as the elastomer composition) contains the energy ray-curable compound (A) having a (meth)acryloyl group and the polythiol compound (B) having 2 to 6 mercapto groups in a molecule, wherein a functional group number ratio of the (meth)acryloyl group in the above composition to the mercapto group in the component (B) is 100:0.1 to 100:5n (n is the number of the mercapto group in a molecule of the polythiol compound).

Also, the material of the present invention for a gasket contains the energy ray-curable compound (A) having a (meth)acryloyl group, the polythiol compound (B) having 2 to 6 mercapto groups in a molecule and the (meth)acrylate monomer (D), wherein a functional group number ratio of the (meth)acryloyl group in the above material for a gasket to the mercapto group in the component (B) is 100:0.1 to 100:5n (n is the number of the mercapto group in a molecule of the polythiol compound), and the cured substance obtained by irradiation with an energy ray has an inter-crosslinking point molecular weight Mc falling in a range of 6,000 to 55,000 which is calculated from an equation of Flory-Rehner.

Energy Ray-Curable Compound (A):

In the elastomer composition of the present invention, an energy ray-curable compound having a (meth)acryloyl group, preferably an energy ray-curable oligomer having a (meth)acryloyl group is used as the component (A). Also, in the material of the present invention for a gasket, an energy ray-curable liquid oligomer having a (meth)acryloyl group is used as the component (A).

Those having at least two (meth)acryloyl groups in a molecule can suitably be used as the above energy ray-curable compound and energy ray-curable liquid oligomer from the viewpoints of performances and a processability of the elastomer obtained. The number of the (meth)acryloyl groups in a molecule is usually 2 to 6 groups, preferably 2 to 4 groups and particularly preferably 2 groups.

The (meth)acryloyl group described above shows an acryloyl group or a methacryloyl group.

Energy Ray-Curable (Liquid) Oligomer Having a (Meth)acryloyl Group:

The energy ray-curable (liquid) oligomer having a (meth)acryloyl group shall not specifically be restricted, and capable of being listed are, for example, urethane base (meth)acrylate oligomers, polyester base (meth)acrylate oligomers, polyether base (meth)acrylate oligomers, epoxy base (meth)acrylate oligomers, conjugate diene polymer base (meth)acrylate oligomers and hydrogenated products hereof.

In this regard, the urethane base (meth)acrylate oligomers can be obtained, for example, by reacting polyetherpolyols and polyesterpolyols with polyisocyanates to obtain polyurethane oligomers and esterifying them with (meth)acrylic acid.

The polyester base (meth)acrylate oligomers can be obtained, for example, by condensing polyvalent carboxylic acids with polyhydric alcohols to obtain polyester oligomers having hydroxyl groups at both ends and esterifying the hydroxyl groups thereof, with (meth)acrylic acid or adding alkylene oxides to polyvalent carboxylic acids to obtain oligomers and esterifying the hydroxyl groups at ends thereof with (meth)acrylic acid.

The polyether base (meth)acrylate oligomers can be obtained by esterifying hydroxyl groups of polyetherpolyols with (meth)acrylic acid, and the epoxy base (meth)acrylate oligomers can be obtained, for example, by reacting oxirane rings of bisphenol A type epoxy resins and novolac type epoxy resins having relatively low molecular weights with (meth)acrylic acid to esterify them. Further, epoxy acrylate oligomers of a carboxyl modifying type obtained by modifying partially the above epoxy base (meth)acrylate oligomers with dibasic carboxylic anhydrides can be used as well.

The conjugate diene polymer base (meth)acrylate oligomers include, for example, SBR diacrylates obtained by modifying liquid styrene-butadiene copolymers with acryl, polyisoprene diacrylates obtained by modifying polyisoprene with acryl and the like, and the hydrogenated conjugate diene polymer base (meth)acrylate oligomers can be obtained, for example, by esterifying the hydroxyl groups of hydrogenated polybutadiene or hydrogenated polyisoprene having hydroxyl groups at both ends with (meth)acrylic acid.

The (meth)acrylate shows acrylate or methacrylate, and (meth)acrylic acid shows acrylic acid or methacrylic acid.

In the present invention, the energy ray-curable (liquid) oligomer having a (meth)acryloyl group described above may be used alone or in combination of two or more kinds thereof.

When it is used for application of a sealing member for a gasket, a difunctional urethane base (meth)acrylate oligomer out of the oligomers described above is suited from the viewpoint of a performance and a processability of the elastomers obtained. The difunctional urethane base (meth)acrylate oligomer means that two (meth)acryloyl groups are contained in a molecule of the urethane base (meth)acrylate oligomer.

The above difunctional urethane base (meth)acrylate oligomer can be obtained by reacting polyetherpolyol, polyesterpolyol and carbonatediol each having two hydroxy groups in a molecule with polyisocyanate to obtain a difunctional urethane base oligomer and esterifying it with (meth)acrylic acid.

Capable of being used as the polyetherpolyol having two hydroxy groups described above are, for example, compounds obtained by adding ethylene oxide or propylene oxide to polyethylene glycol, polypropylene glycol, polytetramethylene glycol, polyhexamethylene glycol, 1,3-butylene glycol, 1,4-butylene glycol, neopentyl glycol, cyclohexanedimethanol, 2,2-bis(4-hydroxycyclohexyl)propane and bisphenol A.

The polyesterpolyol having two hydroxy groups described above can be obtained by reacting an alcohol component with an acid component. Capable of being used as the alcohol component are, for example, compounds obtained by adding ethylene oxide or propylene oxide to polyethylene glycol, polypropylene glycol, polytetramethylene glycol, 1,3-butylene glycol, 1,4-butylene glycol, 1,6-hexanediol, neopentyl glycol, 1,4-cyclohexanedimethanol, 2,2-bis(4-hydroxycyclohexyl)propane and bisphenol A or compounds obtained by adding $\epsilon$-caprolactone to them, and dibasic acids such as adipic acid, sebacic acid, azelaic acid, dodecanedicarboxylic acid and the like and acid anhydrides thereof can be used as the acid component. Compounds obtained by reacting simultaneously three ingredients of the alcohol component, the acid component and $\epsilon$-caprolactone each described above can also be used as the polyesterpolyol.

The carbonatediols described above can be obtained by transesterification of diols with diarylcarbonates or dialkylcarbonates such as diphenylcarbonate, bis-chlorophenylcarbonate, dinaphthylcarbonate, phenyl-toluyl-carbonate, phenyl-chlorophenyl-carbonate, 2-tolyl-4-tolyl-carbonate, dimethylcarbonate, diethylcarbonate and the like. The above diols include, for example, 1,6-hexanediol, neopentyl glycol, 1,4-butanediol, 1,8-octanediol, 1,4-cyclohexanedimethanol, 2-methylpropanediol, dipropylene glycol, dibutylene glycol and polyesterdiols which are reaction products of the above diol compounds with dicarboxylic acids such as oxalic acid, malic acid, succinic acid, adipic acid, azelaic acid, hexahydrophthalic acid and the like and $\epsilon$-caprolactone.

The carbonatediols thus obtained are polycarbonatediols having two or more carbonate structures in a molecule.

In the material of the present invention for a gasket, the difunctional urethane base (meth)acrylate oligomer is preferably compounds obtained by reacting the polyetherpolyol or the polyesterpolyol described above with organic isocyanates. For example, alicyclic and aliphatic diisocyanates such as isophoronediisocyanate, 4,4-dicyclohexylmethanediisocyanate, hexamethylenediisocyanate and the like are used as the organic isocyanates described above.

In the present invention, oligomers having a number average molecular weight of 4,000 to 8,000 are suited as the above difunctional urethane base (meth)acrylate oligomer from the viewpoint of easiness in handling and the like. The above number average molecular weight is a value reduced to standard polystyrene which is measured by gel permeation chromatography (GPC).

Polythiol Compound (B):

In the energy ray-curable elastomer composition of the present invention, the polythiol compound used as the component (B) is a compound having 2 to 6 mercapto groups in a molecule.

The above polythiol compound shall not specifically be restricted as long as it has 2 to 6 mercapto groups in a molecule, and capable of being listed are, for example, aliphatic polythiols such as alkanedithiols having 2 to 20 carbon atoms and the like, aromatic polythiols such as xylylenedithiols and the like, polythiols obtained by substituting halogen atoms of halohydrin adducts of alcohols with mercapto groups, polythiols comprising hydrogen sulfide reaction products of polyepoxide compounds and polythiols comprising ester products of polyhydric alcohols having 2 to 6 hydroxyl groups in a molecule with thioglycolic acid, $\beta$-mercaptopropionic acid or $\beta$-mercaptobutanoic acid.

Among the above polythiols, suited are the polythiols comprising the ester products of polyhydric alcohols having 2 to 6 hydroxyl groups in a molecule with thioglycolic acid, β-mercaptopropionic acid or β-mercaptobutanoic acid, particularly the ester products thereof with β-mercaptopropionic acid and the ester products thereof with β-mercaptobutanoic acid since they have a good reactivity and are readily controlled in a chemical structure.

Alkanediol having 2 to 20 carbon atoms, poly(oxyalkylene) glycol, glycerol, diglycerol, trimethylolpropane, ditrimethylolpropane, pentaerythritol, dipentaerythritol and the like can be listed as the polyhydric alcohols having 2 to 6 hydroxyl groups in a molecule described above.

The alkanediol having 2 to 20 carbon atoms may be any of linear, branched and cyclic ones and include, for example, ethylene glycol, trimethylene glycol, propylene glycol, 1,3-butanediol, 1,4-butanediol, neopentyl glycol, 1,6-hexanediol, 1,8-octanediol, 1,9-nonanediol, 1,12-dodecanediol, cyclohexane-1,4-dimethanol, hydrogenated bisphenol A and the like.

The poly(oxyalkylene)glycol includes, for example, diethylene glycol, triethylene glycol, polyethylene glycol, dipropylene glycol, tripropylene glycol, polypropylene glycol, polytetramethylene ether glycol, cyclohexane-1,4-dimethanol ethylene oxide adducts, hydrogenated bisphenol A ethylene oxide adducts, cyclohexane-1,4-dimethanol propylene oxide adducts, hydrogenated bisphenol A propylene oxide adducts and the like.

In the present invention, capable of being preferably used as the polythiol compound of the component (B) are, for example, ethylene glycol di(thioglycolate), ethylene glycol di(β-mercaptopropionate), ethylene glycol di(β-mercaptobutanate), trimethylene glycol di(thioglycolate), trimethylene glycol di(β-mercaptopropionate), trimethylene glycol di(β-mercaptobutanate), propylene glycol di(thioglycolate), propylene glycol di(β-mercaptopropionate), propylene glycol di(β-mercaptobutanate), 1,3-butanediol di(thioglycolate), 1,3-butanediol di(β-mercaptopropionate), 1,3-butanediol di(β-mercaptobutanate), 1,4-butanediol di(thioglycolate), 1,4-butanediol di(β-mercaptopropionate), 1,4-butanediol di(β-mercaptobutanate), neopentyl glycol di(thioglycolate), neopentyl glycol di(β-mercaptopropionate), neopentyl glycol di(β-mercaptobutanate), 1,6-hexanediol di(thioglycolate), 1,6-hexanediol di(β-mercaptopropionate), 1,6-hexanediol di(β-mercaptobutanate), 1,8-octanediol di(thioglycolate), 1,8-octanediol di(β-mercaptopropionate), 1,8-octanediol di(β-mercaptobutanate), 1,9-nonanediol di(thioglycolate), 1,9-nonanediol di(β-mercaptopropionate), 1,9-nonanediol di(β-mercaptobutanate), cyclohexane-1,4-dimethanol di(thioglycolate), cyclohexane-1,4-dimethanol di(β-mercaptopropionate), cyclohexane-1,4-dimethanol di(β-mercaptobutanate), diethylene glycol di(thioglycolate), diethylene glycol di(β-mercaptopropionate), diethylene glycol di(β-mercaptobutanate), triethylene glycol di(thioglycolate), triethylene glycol di(β-mercaptopropionate), triethylene glycol di(β-mercaptobutanate), polyethylene glycol di(thioglycolate), polyethylene glycol di(β-mercaptopropionate), polyethylene glycol di(β-mercaptobutanate), dipropylene glycol di(thioglycolate), dipropylene glycol di(β-mercaptopropionate), dipropylene glycol di(β-mercaptobutanate), tripropylene glycol di(thioglycolate), tripropylene glycol di(β-mercaptopropionate), tripropylene glycol di(β-mercaptobutanate), polypropylene glycol di(thioglycolate), polypropylene glycol di(β-mercaptopropionate), polypropylene glycol di(β-mercaptobutanate), polytetramethylene ether glycol di(thioglycolate), polytetramethylene ether glycol di(β-mercaptopropionate), polytetramethylene ether glycol di(β-mercaptobutanate), di(thioglycolate) of cyclohexane-1,4-dimethanol ethylene oxide adduct, di(β-mercaptopropionate) of cyclohexane-1,4-dimethanol ethylene oxide adduct, di(β-mercaptobutanate) of cyclohexane-1,4-dimethanol ethylene oxide adduct, di(thioglycolate) of hydrogenated bisphenol A ethylene oxide adduct, di(β-mercaptopropionate) of hydrogenated bisphenol A ethylene oxide adduct, di(β-mercaptobutanate) of hydrogenated bisphenol A ethylene oxide adduct, di(thioglycolate) of cyclohexane-1,4-dimethanol propylene oxide adduct, di(β-mercaptopropionate) of cyclohexane-1,4-dimethanol propylene oxide adduct, di(β-mercaptobutanate) of cyclohexane-1,4-dimethanol propylene oxide adduct, di(thioglycolate) of hydrogenated bisphenol A propylene oxide adduct, di(β-mercaptopropionate) of hydrogenated bisphenol A propylene oxide adduct, di(β-mercaptobutanate) of hydrogenated bisphenol A propylene oxide adduct, glycerol tri(thioglycolate), glycerol tri(β-mercaptopropionate), glycerol tri(β-mercaptobutanate), diglycerol tetra(thioglycolate), diglycerol tetra(β-mercaptopropionate), diglycerol tetra(β-mercaptobutanate), trimethylolpropane tri(thioglycolate), trimethylolpropane tri(β-mercaptopropionate), trimethylolpropane tri(β-mercaptobutanate), ditrimethylolpropane tetra(thioglycolate), ditrimethylolpropane tetra(β-mercaptopropionate), ditrimethylolpropane tetra(β-mercaptobutanate), pentaerythritol tetra(thioglycolate), pentaerythritol tetra(β-mercaptopropionate), pentaerythritol tetra(β-mercaptobutanate), dipentaerythritol hexa(thioglycolate), dipentaerythritol hexa(β-mercaptopropionate), dipentaerythritol hexa(β-mercaptobutanate) and the like.

Among the above polythiol compounds, poly(β-mercaptopropionate) and poly(β-mercaptopropionate) bodies are preferred, and particularly polyethylene glycol di(β-mercaptopropionate), pentaerythritol tetra(β-mercaptopropionate), dipentaerythritol hexa(β-mercaptopropionate), polyethylene glycol di(β-mercaptobutanate), pentaerythritol tetra(β-mercaptobutanate) and dipentaerythritol hexa(β-mercaptobutanate) are suited from the viewpoint of an availability and the performances of the elastomers obtained.

The polythiol compounds of the component (B) described above may be used alone or in combination of two or more kinds thereof. Also, a content of the above polythiol compound of the component (B) in the elastomer composition of the present invention is selected so that a functional group number ratio of the (meth)acryloyl group in the elastomer composition to the mercapto group in the component (B) falls in a range of 100:0.1 to 100:5n (n is the number of the mercapto group in a molecule of the polythiol compound).

That is, when the difunctional compound having two mercapto groups in a molecule is used as the polythiol compound, a functional group number ratio of the (meth)acryloyl group/the mercapto group is 100:0.1 to 100:10; when the tetrafunctional compound having four mercapto groups is used, a functional group number ratio of the (meth)acryloyl group/the mercapto group is 100:0.1 to 100:20; and when the hexafunctional compound having six mercapto groups is used, a functional group number ratio of the (meth)acryloyl group/the mercapto group is 100:0.1 to 100:30.

If the mercapto group accounts for less than 0.1 based on 100 of the (meth)acryloyl group, the effect of blending the polythiol compound is not sufficiently exerted, and the objects of the present invention are not achieved. On the other hand, if the mercapto group exceeds an upper limit value which is added according to the polythiol compound used based on 100 of the (meth)acryloyl group, the elastomer-cured substance obtained causes fluid fracture. From the viewpoints described above, a functional group number ratio of the (meth)acryloyl group in the elastomer composition to the mercapto group in the component (B) falls in a range of preferably 100:n to 100:5n, more preferably 100:2n to 100:5n.

In the elastomer composition and the material for a gasket according to the present invention, a content of the polythiol compound of the above component (B) is preferably 0.5 to 7 parts by mass based on 100 parts by mass of the component (A). If a content of the above polythiol compound falls in the range described above, an inter-crosslinking point molecular weight Mc of a cured substance obtained by irradiating the material for a gasket with an energy ray is controlled in a prescribed range described later, and the breaking elongation is enhanced without damaging the processability and other physical properties. A content of the above polythiol compound is preferably 1 to 7 parts by mass, more preferably 1 to 5 parts by mass, more preferably 1 to 4.5 parts by mass, further preferably 1 to 3.5 parts by mass and particularly preferably 1 to 2.5 parts by mass.

The elastomer composition and the material for a gasket according to the present invention are an energy ray-curable type, and a UV ray and an ionizing radiation such as an electron beam, an α ray, a β ray, a γ ray and the like can be used as the energy ray. In the present invention, a UV ray is preferably used from the viewpoints of the operability, the productivity, the economical efficiency and the like. When a UV ray is used, the elastomer composition and the material for a gasket contain preferably a radical photo-polymerization initiator as the component (C). When an ionizing radiation such as an electron beam and a γ ray is used, curing can quickly be promoted without adding a radical photo-polymerization initiator.

(C) Radical Photo-Polymerization Initiator:

Initiators of an intramolecular cleavage type and/or a hydrogen drawing type can be used as the radical photo-polymerization initiator of the component (C).

The intramolecular cleavage type includes benzoin derivatives, benzyl ketals (for example, trade name: Irgacure 651, manufactured by Ciba Specialty Chemicals K.K.), α-hydroxyacetophenones (for example, trade names: Darocur 1173, Irgacure 184, Irgacure 127, Irgacure 2959, manufactured by Ciba Specialty Chemicals K.K.), α-aminoacetophenones (for example, trade names: Irgacure 907, Irgacure 369, manufactured by Ciba Specialty Chemicals K.K.), combined use of α-aminoacetophenones and thioxanthones (for example, isopropylthioxanthone, diethylthioxanthone), acylphosphine oxide (for example, trade name: Irgacure 819, manufactured by Ciba Specialty Chemicals K.K.) and the like.

The hydrogen drawing type includes combined use of benzophenones and amines, combined use of thioxanthones and amines and the like. Further, the intramolecular cleavage type and the hydrogen drawing type may be used in combination. Among them, α-hydroxyacetophenones converted into oligomers and benzophenones converted into acrylates are preferred. To be more specific, they include oligo[2-hydroxy-2-methyl-1-[4-(1-methylvinyl)phenyl]propane] (for example, trade name: ESACURE KIP150 and the like, manufactured by Lamberti S.p.A), acrylated benzophenones (for example, trade name: Ebecryl P136 and the like, manufactured by Daicel Ucb Co., Ltd.), imide acrylates and the like.

Capable of being also used as the radical photo-polymerization initiator of the component (C) are, in addition to the above products, 1-[4-(2-hydroxyethoxy)phenyl]-2-methyl-1-propane-1-one, 1-hydroxy-cyclohexyl phenyl ketone, mixtures of 1-hydroxy-cyclohexyl phenyl ketone and benzophenone, 2,2-dimethoxy-1,2-diphenylethane-1-one, 2,4,6-trimethylbenzoylphenylphosphine oxide, 2,4,6-trimethylbenzoylphenylphenylethoxyphosphine oxide, 2-benzyl-2-dimethylamino-1-(4-morpholinophenyl)butanone-1,2-hydroxy-2-methyl-1-phenyl-propane-1-one, 2-methyl-1-[(4-methylthio)phenyl]-2-morpholinopropane-1-one, benzoyl methyl ether, benzoyl ethyl ether, benzoyl butyl ether, benzoyl isopropyl ether, bis(2,4,6-trimethylbenzoyl)phenylphosphine oxide, 2-hydroxy-2-methyl-[4-(1-methylvinyl)phenyl]propanol oligomer, mixtures of 2-hydroxy-2-methyl-[4-(1-methylvinyl)phenyl]propanol oligomer and 2-hydroxy-2-methyl-1-phenyl-propanone, isopropylthioxanthone, methyl o-benzoylbenzoate, [4-(methylphenylthio)phenyl]phenylmethane and the like.

When the radical photo-polymerization initiator is added to the elastomer composition and the material for a gasket according to the present invention, a content thereof is usually 0.1 to 10 parts by mass, preferably 0.5 to 3 parts by mass based on 100 parts by mass of all the compounds of an energy ray-curable type (for example, the component (A), the component (D) described later and the like) contained in the above composition or material. Further, in the present invention, publicly known photo-sensitizers can be used as well in combination with the radical photo-polymerization initiator.

(D) (Meth)Acrylate Monomer:

Further, a (meth)acrylate monomer is added as the component (D) to the material of the present invention for a gasket. The above component (D) may be added as an optional component of the elastomer composition of the present invention.

The above (meth)acrylate monomer is a monomer used for controlling a viscosity of the material of the present invention for a gasket and controlling the physical properties of the gasket obtained, and a monofunctional (meth)acrylate monomer having one (meth)acryloyl group in a molecule is suited.

The monofunctional (meth)acrylate monomer is preferably the monomers having a molecular weight of less than 1,000. The above monofunctional (meth)acrylate monomer includes, for example, cyclohexyl(meth) acrylate, dicyclopentenyl(meth)acrylate, dicyclopentenyl(meth)acrylate, dicyclopentenyloxyethyl(meth)acrylate, diethylene glycol monoethyl ether(meth)acrylate, dimethylaminoethyl(meth) acrylate, dipropylene glycol mono(meth)acrylate, ethoxydiethylene glycol(meth)acrylate, ethoxized phenyl(meth)acrylate, ethyl(meth)acrylate, isoamyl(meth)acrylate, isobornyl (meth)acrylate, isobutyl(meth)acrylate, isodecyl(meth) acrylate, isooctyl(meth)acrylate, isostearyl(meth)acrylate, isomyristyl(meth)acrylate, lauroxypolyethylene glycol (meth)acrylate, lauryl(meth)acrylate, methoxydipropylene glycol(meth)acrylate, methoxytripropylene glycol(meth) acrylate, methoxypolyethylene glycol(meth)acrylate, methoxytriethylene glycol(meth)acrylate and the like.

An alcohol residue of the (meth)acrylate monomer is preferably an alcohol residue which is a cross-linked alicyclic hydrocarbon group, and to be specific, it is more preferably alcohol residues having a bicyclic alicyclic hydrocarbon group such as isobornyl(meth)acrylate and the like and alcohol residues having a tricyclic alicyclic hydrocarbon group such as dicyclopentanyl(meth)acrylate, dicyclopentenyl (meth)acrylate and the like. Further, saturated cross-linked alicyclic hydrocarbon groups are preferred. To be more specific, isobornyl(meth)acrylate and dicyclopentanyl(meth) acrylate are particularly preferred.

In the present invention, the (meth)acrylate monomer of the component (D) may be used alone or in combination of two or more kinds thereof. Also, a content thereof falls in a range of preferably 5 to 40 parts by mass, more preferably 5 to 20 parts by mass based on 100 parts by mass of the component (A) described above. If a content of the above component (D) falls in the above range, the elastomer composition or the material for a gasket obtained has a suitable fluidity and is provided with a good handling property; the form of the gasket and the like can be maintained; and it can provide an elastomer-cured substance or a gasket which is enhanced in a breaking elongation and which has good performances.

Optional Components:

In the elastomer composition and the material for a gasket according to the present invention, an inorganic filler, an organic thickener, a coupling agent, an antioxidant, a light stabilizer, carbodiimides, an adhesion improving agent, a reinforcing agent, an inside mold releasing agent, a softening agent, a colorant, a leveling agent, a flame retardant, an antistatic agent and the like can be added, if necessary, as long as the objects of the present invention are not damaged.

Inorganic Filler:

Blending the elastomer composition of the present invention with the inorganic filler and the organic thickener described later makes it possible to provide the above composition with a thickening property and a thixotropy and enhance a moldability of the composition.

The inorganic filler includes silica ($SiO_2$), alumina, titania, clay minerals and the like, and among them, silica powder, silica powder subjected to hydrophobic treatment or mixtures thereof are preferred. To be more specific, it includes silica fine powder converted into fine powder by a wet method (for example, trade name: Aerosil 300 and the like, manufactured by Nippon Aerosil Co. Ltd.), fine powder obtained by modifying the above silica fine powder with trimethyldisilazane (for example, trade name: Aerosil RX300 and the like, manufactured by Nippon Aerosil Co. Ltd.), fine powder obtained by modifying the silica fine powder described above with polydimethylsiloxane (for example, trade name: Aerosil RY300 and the like, manufactured by Nippon Aerosil Co. Ltd.) and the like.

An average particle diameter of the inorganic filler is preferably 5 to 50 μm, more preferably 5 to 12 μm from the viewpoint of providing a thickening property and a thixotropy.

Organic Thickener:

The organic thickener is preferably hydrogenated castor oil, amide wax or mixtures thereof. The organic thickener includes, to be specific, hydrogenated castor oil (for example, trade name: ADVITROL 100, manufactured by Süd Chemie Catalysts Japan, Inc., trade name: Disparlon 305, manufactured by Kusumoto Chemicals Co. Ltd. and the like) which is a hydrogenated product of castor oil (principal component is nondrying oil of ricinoleic acid) and higher amide wax (for example, trade name: Disparlon 6500 and the like, manufactured by Kusumoto Chemicals Co. Ltd.) which is a compound obtained by substituting hydrogen of ammonia with an acyl group.

They may be used alone or in combination of two or more kinds thereof or may be used in combination with the inorganic filler described above.

When the organic thickener is added, a content thereof is preferably 0.01 to 7 parts by mass, more preferably 0.1 to 5 parts by mass and further preferably 1 to 5 parts by mass based on a total amount 100 parts by mass of the component (A), the component (B) and the component (D) when the component (D) is contained.

Coupling Agent:

The coupling agent is used, if necessary, for the elastomer composition of the present invention in a suited amount in order to enhance an adhesive property of the elastomer obtained with the base material. The above coupling agent includes silane base coupling agents, titanate base coupling agents, aluminum base coupling agents and the like, and among them, the silane base coupling agents are suited.

The coupling agent described above shall not specifically be restricted and includes, for example, unsaturated group-containing silane coupling agents such as vinyltrimethoxysilane, vinyltriethoxysilane, γ-methacryloxypropyltrimethoxysilane, γ-methacryloxypropyltriethoxysilane and the like; glycidyl group-containing silane coupling agents such as γ-glycidoxypropyltrimethoxysilane, γ-glycidoxypropyltriethoxysilane and the like; amino group-containing silane coupling agents such as γ-aminopropyltrimethoxysilane, γ-aminopropyltriethoxysilane, N-β-(aminoethyl)-γ-aminopropyltrimethoxysilane, N-β-(aminoethyl)-γ-aminopropyltriethoxysilane and the like; and mercapto group-containing silane coupling agents such as γ-mercaptopropyltrimethoxysilane, γ-mercaptopropyltriethoxysilane and the like. The above silane base coupling agents may be used alone or in combination of two or more kinds thereof.

Antioxidant:

The antioxidant used for the elastomer composition of the present invention includes phenol base antioxidants, sulfur base antioxidants, phosphorus base antioxidants and the like.

Shown as the examples of the phenol base antioxidants are 2,6-di-t-butyl-p-cresol, butylated hydroxyanisole, 2,6-di-t-butyl-4-ethylphenol, stearyl-β-(3,5-di-t-butyl-4-hydroxyphenyl)propionate, 2,2'-methylenebis(4-methyl-6-t-butylphenol), 2,2'-methylenbis(4-ethyl-6-t-butylphenol), 4,4'-thiobis(3-methyl-6-t-butylphenol), 4,4'-butylidenebis(3-methyl-6-t-butylphenol), 1,1,3-tris(2-methyl-4-hydoxy-5-t-butylphenylbutane), 1,3,5-trimethyl-2,4,6-tris(3,5-di-t-butyl-4-hydroxybenzyl)benzene, tetrakis-[methylene-3-(3', 5'-di-t-butyl-4'-hydroxyphenyl)propyionate]methane, bis[3, 3'-bis(4'-hydroxy-3'-t-butylphenyl)butylic acid]glycol ester, 1,3,5-tris(3',5'-di-t-butyl-4'-hyroxybenzyl)-s-triazine-2,4,6-(1H,3H,5H)trion, α-tocopherol and the like.

Dilauryl 3,3'-thiodipropionate, dimyristyl 3,3'-thiodipropionate, distearyl 3,3'-thiodipropionate and the like are shown as the examples of the sulfur base antioxidants, and triphenyl phosphite, diphenyl isodecyl phosphite, phenyl isodecyl phosphite, tris(nonylphenyl)phosphite, tris(2,4-di-t-butylphenyl)phosphite, 2,2'-methylenebis(4,6-di-t-butylphenyl)octyl phosphite and the like are shown as the examples of the phosphorus base antioxidants.

The above antioxidants may be used alone or in combination of two or more kinds thereof, and among them, the phenol base antioxidants are suited.

When the antioxidant is added, a content thereof is suitably selected according to the kind thereof, and it is preferably 0.01 to 5 parts by mass, more preferably 0.1 to 3 parts by mass based on a total amount 100 parts by mass of the component (A), the component (B) and the component (D) when the component (D) is contained.

Light Stabilizer:

The light stabilizer used for the elastomer composition of the present invention includes UV absorbers of a benzophenone base, a benzotriazole base, a benzoate base and a triazine base, hindered amine base light stabilizers and the like, and among them, the hindered amine base light stabilizers are preferred.

The above hindered amine base light stabilizers include bis(2,2,6,6-tetramethyl-4-piperidyl) sebacate, bis(1,2,2,6,6-pentamethyl-4-piperidyl) sebacate, 4-benzoyloxy-2,2,6,6-tetramethylpiperidine, 1-[2-[3-(3,5-di-tert-butyl-4-hydroxypheny)propionyloxyl]ethyl]-4-[3-(3,5-di-tert-butyl-4-hydroxyphenyl-propionyloxy)-2,2,6,6-tetramethylpiperidine, 1,2,2,6,6-pentamethyl-4-piperidinyl-methacrylate, bis(1,2,2,6,6-pentamethyl-4-piperidinyl[[3,5- bis(1,1-dimethylethyl)-4-hydroxyphenyl]methyl] butylmaronate, decanedioic acid bis(2,2,6,6-tetramethyl-1-(octyloxy)-4-piperidinyl)ester, N,N',N'',N'''-tetrakis-(4,6-bis-(butyl-(N-methyl-2,2,6,6-tetramethylpiperidine-4-yl)amino)-triazine-2-yl)-4,7-diazadecane-1,10-diamine, a polycondensation product of dibutylamine-1,3,5-triazine-N,N'-bis(2,2,6,6-tetramethyl-4-piperidyl-1,6-hexamethylenediamine and N-(2,2,6,6-tetramethyl-4-piperidyl)butylamine, poly[[6-(1,1,3,3-tetramethylbutyl)amino-1,3,5-triazine-2,4-diyl]][(2,2,6,6-tetramethyl-4-peperidyl)imino]hexamethylene[(2,2,6,6-tetramethyl-4-piperidyl)imino]], a polymer of dimethyl succinate and 4-hydroxy-2,2,6,6-tetramethyl-1-piperidine ethanol, 2,2,4,4-tetramethyl-20-(β-lauryloxycarbonyl)ethyl-7-oxa-3,20-diazadispiro[5.1.11.2]heneicosane-21-one, β-alanine, N-(2,2,6,6-tetramethyl-4-piperidinyl)-dodecyl ester/tetradecyl ester, N-acetyl-3-dodecyl-1-(2,2,6,6-tetramethyl-4-piperidinyl)pyrrolidine-2,5-dione, 2,2,4,4-tetramethyl-7-oxa-3,20-diazadispiro[5.1.11.2]heneicosane-21-one, 2,2,4,4-tetramethyl-21-oxa-3,20-diazadicyclo-[5.1.11.2]-heneicosane-20-propanonic acid dodecyl ester/tetradecyl ester propanedioic acid, [(4-methoxyphenyl)-methylene]-bis(1,2,2,6,6-pentamethyl-4-piperidinyl)ester, higher fatty acid ester of 2,2,6,6-tetramethyl-4-piperidinol, 1,3-benzenedicarboxyamide-N,N'-bis(2,2,6,6-tetramethyl-4-piperidinyl) and the like.

They may be used alone or in combination of two or more kinds thereof.

When the light stabilizer is added, a content thereof is suitably selected according to the kind thereof, and it is preferably 0.01 to 5 parts by mass, more preferably 0.1 to 3 parts by mass based on a total amount 100 parts by mass of the component (A), the component (B) and the component (D) when the component (D) is contained.

Carbodiimides:

Commercial products such as "Elastostab H01" (manufactured by Nisshin Spinning Co., Ltd.) can be used as the carbodiimides.

When the carbodiimides are added, a content thereof is suitably selected according to the kind thereof, and it is preferably 0.01 to 5 parts by mass, more preferably 0.1 to 3 parts by mass based on a total amount 100 parts by mass of the component (A), the component (B) and the component (D) when the component (D) is contained.

Adhesion Improving Agent and Others:

In the elastomer composition and the material for a gasket according to the present invention, the adhesion improving agent used if desired includes, for example, terpene resins, terpene phenol resins, coumarone resins, coumarone-indene resins, petroleum base hydrocarbons, rosin derivatives and the like. They may be used alone or in combination of two or more kinds thereof.

The elastomer composition and the material for a gasket according to the present invention can be blended, if necessary, with a reinforcing agent such as glass fibers, carbon fibers and the like; a sagging inhibitor such as hydrogenated castor oil, silicic anhydride fine particles and the like; an inside mold releasing agent including fatty acids such as stearic acid and the like, fatty acid metal salts such as calcium stearate and the like, fatty acid amides such as stearoamide and the like, fatty acid esters, polyolefin wax, paraffin wax and the like; a softening agent such as process oil and the like; a colorant; a leveling agent; a flame retardant; an antistatic agent and the like.

The elastomer composition of the present invention does not contain fundamentally a solvent, but a solvent may be added if necessary.

Preparation of Elastomer Composition and Material for a Gasket:

Methods for preparing the elastomer composition and the material for a gasket according to the present invention shall not specifically be restricted, and publicly known methods can be applied.

In a case of, for example, the elastomer composition, it can be prepared by kneading the component (A), the component (B), the component (C) used if necessary and the other optional components described above by means of a kneading equipment in which temperature can be controlled, for example, a single shaft extruding equipment, a double shaft extruding equipment, a planetary mixer, a double shaft mixer, a high shearing mixer and the like. Also, in a case of the material for a gasket, it can be prepared by kneading the component (A), the component (B), the component (D), the component (C) used if necessary and the other optional components described above by means of a kneading equipment in which temperature can be controlled, for example, a single shaft extruding equipment, a double shaft extruding equipment, a planetary mixer, a double shaft mixer, a high shearing mixer and the like.

A viscosity of the elastomer composition thus obtained is preferably 1 to 1,000 Pa·s at a temperature of 50° C. and a shear rate of 1.0/second. If the viscosity falls in the above range, the liquid can be prevented from leaking to prevent the molded matter having a targeted form from being not obtained, and the composition can readily be filled. Also, when a die is used, the die is prevented from being pushed up, so that the molded matter having a targeted form is readily obtained. From the above viewpoints, the viscosity at a temperature of 50° C. and a shear rate of 1.0/second falls in a range of more preferably 10 to 500 Pa·s.

Also, a viscosity of the material of the present invention for a gasket obtained in the manner described above falls in a range of preferably 1 to 10,000 Pa·s at a temperature of 50° C. and a shear rate of 1.0/second. If the viscosity falls in the above range, the material for a gasket has a suitable fluidity and a good handling property and can maintain a gasket form. The above viscosity is more preferably 10 to 2,000 Pa·s, more preferably 30 to 1,000 Pa·s, more preferably 50 to 500 Pa·s and further preferably 80 to 200 Pa·s.

The viscosity described above is a value measured by a method described in the example.

Preparation of Elastomer-Cured Substance and Gasket:

In the present invention, the energy ray-curable elastomer composition or the energy ray-curable material for a gasket prepared in the manner described above is irradiated with an energy ray, whereby an elastomer-cured substance or a gasket can be obtained.

A UV ray is suited as the energy ray, as described above, from the viewpoints of the operability, the productivity, the economical efficiency and the like. A xenon lamp, a low pressure mercury lamp, a high pressure mercury lamp, a metal halide lamp, a microwave system excimer lamp and the like can be listed as the UV ray source. Atmosphere in which a UV ray is radiated is preferably inert gas atmosphere of nitrogen gas, carbon dioxide gas and the like or atmosphere in which an oxygen concentration is reduced, and curing can sufficiently be expedited even in usual air atmosphere. The irradiation atmosphere temperature can be set usually to 10 to 200° C.

A method for curing the above elastomer composition or the material for a gasket by irradiation with an energy ray (preferably a UV ray) can suitably be selected according to the uses of the elastomer-cured substance or the gasket obtained.

Next, the examples of a case in which the above elastomer composition or the material for a gasket is used to prepare a member provided with a sealing layer (or a member provided with a gasket) such as a gasket for HDD (hard disk device) of a computer and an independent elastomer-cured substance (or a gasket) having no support and no adherend and a case in which they are used as an adhesive for an optical sticking disk shall be listed to explain the preferred embodiments of the curing methods in the respective cases.

The uses of the elastomer composition of the present invention shall be explained later.

Member Provided with a Sealing Layer and a Member Provided with a Gasket:

The energy ray-curable elastomer composition or the material for a gasket according to the present invention is coated on an adherend and cured by irradiating with an energy ray (preferably a UV ray), whereby a member provided with a sealing layer or a member provided with a gasket layer can be produced. A substance comprising a hard resin can be used as the adherend, and a substance made of metal is preferred from the viewpoint of a processability. The metal shall not specifically be restricted, and capable of being used are those suitably selected from a cold-rolled steel plate, zinc-plated steel plate, an aluminum/zinc alloy-plated steel plate, a stainless steel plate, an aluminum plate, an aluminum alloy plate, a magnesium plate, a magnesium alloy plate and the like. Further, those obtained by subjecting magnesium to injection molding can be used as well. Metals subjected to nickel plating treatment are suited in terms of a corrosion resistance.

The member provided with a sealing layer or the member provided with a gasket layer includes a gasket for a sealing material and HDD, a seal for an ink tank, a liquid crystal seal and the like. A thickness of the sealing layer can suitably be selected according to the uses, and it is usually 0.1 to 2 mm.

The elastomer composition or the material for a gasket described above can be coated on an adherend by an optional method using a coating liquid obtained by controlling, if necessary, a temperature of the elastomer composition described above and adjusting it to a fixed viscosity, and capable of being used are, for example, gravure coating, roll coating, spin coating, reverse coating, bar coating, screen coating, blade coating, air knife coating, dipping, dispensing and the like. The elastomer composition or the material for a gasket is coated and molded, and then the coating layer is cured by irradiating with an energy ray, preferably a UV ray, whereby the member provided with a sealing layer or the member provided with a gasket layer can be obtained.

Independent Elastomer-Cured Substance and Independent Gasket:

An independent elastomer-cured substance shows an elastomer-cured substance itself which does not have a support and an adherend, and an independent gasket shows a gasket itself which does not have a support and an adherend.

Various methods can be employed as means for producing the independent elastomer-cured substance or gasket described above by irradiation with a UV ray. They preferably include, for example, (1) a method in which any one of a set of molding dies comprising an upper die and a lower die is formed from a material transmitting a UV ray, and the dies are charged with a prescribed amount of the elastomer composition or the material for a gasket before cured; next, the upper die and the lower die are put together by pressing to close the dies, and the die made of the material transmitting a UV ray is irradiated from an outside thereof with a UV ray to cure the above elastomer composition or material for a gasket and obtain the targeted cured substance or gasket and (2) a method in which any one of a set of molding dies comprising an upper die and a lower die is formed from a material transmitting a UV ray, and then the upper die and the lower die are put together by pressing to close the dies; next, a prescribed amount of the elastomer composition or the material for a gasket before cured is charged into the dies from a charging port formed in advance in the die; then, the die made of the material transmitting a UV ray is irradiated from an outside thereof with a UV ray to cure the above elastomer composition or material for a gasket and obtain the targeted cured substance or gasket.

Capable of being shown as the examples of a material used for the die transmitting a UV ray are, for example, glass materials such as quarts, quarts glass, borosilicate glass, soda glass and the like and resin materials such as acryl resins, polycarbonate resins, polystyrene resins, polyester resins, polyethylene resins, polypropylene resins, fluorocarbon resins, cellulose resins, styrene-butadiene copolymers, methyl methacrylate-styrene copolymers and the like, but it shall not be restricted to them. The acryl resins such as polymethyl methacrylate and the like are particularly preferred.

Adhesive for an Optical Sticking Disk:

When the energy ray-curable elastomer composition of the present invention is used as an adhesive for an optical sticking disk adhering disk members themselves in which informations are optically recorded or adhering a disk member in which informations are recorded with a different disk member having the same form so that the informations can be reproduced, the following operation is usually carried out.

Carried out is a method in which the above elastomer composition is coated on a sticking face of a disk member comprising a base of a plastic base material such as polycarbonate, polymethyl methacrylate and the like by a spin coating method, a roll coating method, a silk screen method and the like and in which after the other disk member is stuck thereon, the disk member is irradiated from one face or both faces with an energy ray (preferably a UV ray) to cure the above elastomer composition. A thickness of the coating film described above is preferably 20 to 50 μm in terms of a thickness after irradiated with an energy ray.

Properties of the Elastomer-Cured Substance:

In the energy ray-curable elastomer composition of the present invention, adding the energy ray-curable elastomer composition of the component (A) and the polythiol compound of the component (B) and employing an energy ray-curing system of an ene-thiol base make it possible, as described above, to increase an inter-crosslinking point molecular weight of the cured substance without changing the kind of the energy ray-curable compound before cured and provide the elastomer-cured substance in which a braking elongation is compatible with a processability.

The elastomer-cured substance obtained by curing the above elastomer composition by irradiation with an energy ray has preferably an inter-crosslinking point molecular weight falling in a range of 4,000 to 55,000 which is calculated from an equation of Flory-Rehner shown below. If the inter-crosslinking point molecular weight is 4,000 or more, an effect of enhancing a braking elongation in the elastomer-cured substance is exerted well. On the other hand, if the inter-crosslinking point molecular weight is 55,000 or less, the elastomer-cured substance is excellent in a processability and provided with a practical strength as the elastomer.

The elastomer-cured substance of the present invention obtained by curing the elastomer composition of the present invention by irradiation with an energy ray has physical properties shown below.

(1) Inter-Crosslinking Point Molecular Weight Mc, Braking Elongation and Fracture Strength:

The elastomer-cured substance of the present invention is selected so that the inter-crosslinking point molecular weight described above falls in a range of 4,000 to 55,000. If the above Mc falls in the range described above, the braking elongation (Eb) at 23° C. can be enhanced to 330 to 960%, and the fracture strength (Tb) at 23° C. can be controlled to 0.4 to 6.5 MPa. Further, the braking elongation (Eb) at 80° C. can be enhanced to 150 to 750%, and the fracture strength (Tb) at 80° C. can be controlled to 0.05 to 0.85 MPa.

(2) Compression Set (C.S.):

In general, if an inter-crosslinking point molecular weight is increased, a compression set is deteriorated. In the present invention, however, since an energy ray-curing system of an ene-thiol base is employed, the compression set can be inhibited from being deteriorated to a large extent even if the inter-crosslinking point molecular weight is increased.

Properties of the Gasket:

In the energy ray-curable material of the present invention for a gasket, adding the energy ray-curable liquid oligomer of the component (A), the (meth)acrylate monomer of the component (B) and the polythiol compound of the component (C) and employing an energy ray-curing system of an ene-thiol base make it possible, as described above, to increase an inter-crosslinking point molecular weight of the cured substance and provide the cured substance in which a braking elongation is enhanced without damaging a processability and other physical properties.

The gasket obtained by curing the above material for a gasket by irradiation with an energy ray has an inter-crosslinking point molecular weight falling in a range of 6,000 to 55,000 which is calculated from the equation of Flory-Rehner shown below. If the above inter-crosslinking point molecular weight is 6,000 or more, an effect of enhancing a braking elongation in the gasket described above is exerted well. On the other hand, if the inter-crosslinking point molecular weight is 55,000 or less, the above gasket has a practical strength.

The gasket of the present invention obtained by curing the material of the present invention for a gasket by irradiation with an energy ray has physical properties shown below.

(1) Inter-Crosslinking Point Molecular Weight Mc, Braking Elongation and Fracture Strength:

As explained in the properties of the cured substance of the material for a gasket, the gasket of the present invention is selected so that the inter-crosslinking point molecular weight Mc which is calculated from the equation of Flory-Rehner falls in a range of 6,000 to 55,000. If the above Mc falls in the range described above, the braking elongation (Eb) at 23° C. can be enhanced to 380 to 960%, and the fracture strength (Tb) at 23° C. can be controlled to 0.4 to 5.0 MPa.

(2) Hardness:

The gasket of the present invention has a hardness falling preferably in a range of 5 to 50 degrees measured by means of a type A durometer according to JIS K 6253. If the above hardness falls in the range described above, the gasket can sufficiently exert performances as the elastomer. The more preferred hardness is 10 to 45 degrees.

(3) 85° C. tan δ:

A value of 85° C. tan δ (loss tangent) in the gasket of the present invention according to a viscoelasticity measuring test tends to grow larger as a functional group number ratio of SH group/$CH_2$=CHCO group grows larger, that is, the inter-crosslinking point molecular weight Mc grows larger. That is, if a functional group number ratio of SH group/$CH_2$=CHCO group grows larger, the hysteresis loss particularly in a high temperature area grows larger.

(4) Compression Set (C.S.):

In general, if an inter-crosslinking point molecular weight is increased, a compression set is deteriorated. In the present invention, however, since an energy ray-curing system of an ene-thiol base is employed, the compression set can be inhibited from being deteriorated to a large extent even if the inter-crosslinking point molecular weight is increased.

(5) Compression Heat Shock Test:

In the gasket of the present invention, the gasket in which a 23° C. breaking elongation is 400% or more (the gasket having an inter-crosslinking point molecular weight of 6,000 or more) is not observed to be broken after 100 cycles of 30 minutes at −40° C.⇔ 30 minutes at 85° C. in a 50% compression heat shock test.

The respective characteristic values described above are measured by the methods described in the examples.

Inter-Crosslinking Point Molecular Weight:

The inter-crosslinking point molecular weights Mc of the elastomer-cured substance and the gasket can be calculated by the following method:

The inter-crosslinking point molecular weight Mc can be calculated from the following equation.

Equation of Flory-Rehner:

$$Mc = \frac{\rho v_1 (v_2/2 - 3\sqrt{v_2})}{\ln(1 - v_2) + v_2 + \chi_1 v_2^2}$$

(wherein Mc: inter-crosslinking point molecular weight (g/mol), ρ: density (g/cm³), $v_1$: mole volume (cm³/mol) of a solvent (toluene), $v_2$: volume expansion coefficient (−), $\chi_1$: χ parameter (−) of Flory (approximately calculated from the sp values of the solvent and the elastomer-cured substance or the gasket).

In the present invention, a value calculated from the equation of Flory-Rehner is employed as the inter-crosslinking point molecular weight Mc.

The above inter-crosslinking point molecular weight Mc can be controlled by selecting the kind of the polythiol compound of the component (B) used and selecting a use proportion of the above polythiol compound to the component (A), and eventually the breaking elongation can be controlled.

In the present invention, using the polythiol compound having 2 to 6 mercapto groups in a molecule, as described above, as the polythiol compound of the component (B) and selecting a functional group number ratio (CH=C(R)—COO/SH ratio, provided that R is a hydrogen atom or methyl) of the (meth)acryloyl group in the component (A) to the mercapto group in the component (B) so that it falls in a range of 100/0.1 to 100/5n (n is the number of the mercapto group in a molecule of the polythiol compound) make it possible to control an inter-crosslinking point molecular weight Mc of the elastomer-cured substance obtained to a desired value in a range of 4,000 to 55,000 and control an inter-crosslinking point molecular weight Mc of the material for a gasket obtained to a desired value in a range of 6,000 to 55,000.

—Case of the Elastomer Composition of the Present Invention—

In a case in which used as shown in the examples described later are, for example, a difunctional urethane base acrylate oligomer as the component (A) and a difunctional thiol compound as the component (B) and in which the CH=C(R)—

COO/SH ratio is changed from 100/2 to 100/10, the inter-crosslinking point molecular weight Mc is increased from about 5,600 to 31,900, and a breaking elongation Eb of the elastomer-cured substance at room temperature is increased from 360% to 875%.

On the other hand, in a case in which used in the same manner as described above are a difunctional urethane base acrylate oligomer as the component (A) and a tetrafunctional thiol compound as the component (B) and in which the CH=C(R)—COO/SH ratio is changed from 100/5 to 100/20, the inter-crosslinking point molecular weight Mc is increased from about 6,500 to 51,000, and a breaking elongation Eb of the elastomer-cured substance at room temperature is increased from 400% to 955%.

Further, in a case in which used as is the case with described above are a difunctional urethane base acrylate oligomer as the component (A) and a hexafunctional thiol compound as the component (B) and in which the CH=C(R)—COO/SH ratio is changed from 100/5 to 100/30, the inter-crosslinking point molecular weight Mc is increased from about 4,900 to 36,000, and a breaking elongation Eb of the elastomer-cured substance at room temperature is increased from 335% to 775%.

—Case of the Material of the Present Invention for a Gasket—

In a case in which used as shown in the examples described later are, for example, a difunctional urethane base acrylate oligomer as the component (A) and a difunctional thiol compound as the component (B) and in which the CH=C(R)—COO/SH ratio is changed from 100/5 to 100/10, the inter-crosslinking point molecular weight Mc is increased from about 9,860 to 31,900, and a breaking elongation Eb of the above cured substance at room temperature is increased from 525% to 875%.

On the other hand, in a case in which used in the same manner as described above are a difunctional urethane base acrylate oligomer as the component (A) and a tetrafunctional thiol compound as the component (B) and in which the CH=C(R)—COO/SH ratio is changed from 100/5 to 100/20, the inter-crosslinking point molecular weight Mc is increased from about 6,500 to 51,000, and a breaking elongation Eb of the above cured substance at room temperature is increased from 400% to 955%.

Further, in a case in which used as is the case with described above are a difunctional urethane base acrylate oligomer as the component (A) and a hexafunctional thiol compound as the component (B) and in which the CH=C(R)—COO/SH ratio is changed from 100/7.5 to 100/30, the inter-crosslinking point molecular weight Mc is increased from about 6,400 to 36,000, and a breaking elongation Eb of the above cured substance at room temperature is increased from 385% to 775%.

A method for measuring the breaking elongation Eb described above shall be explained later.

As described above, when even any one of the difunctional to hexafunctional thiol compounds are used, the elastomer-cured substance or the cured substance of the material for a gasket is increased in an inter-crosslinking point molecular weight by adding a small amount thereof, and as a result thereof, the breaking elongation at room temperature can be improved to a large extent. The breaking elongation at 80° C. shows the same trend.

When the difunctional thiol compound which provides the smallest crosslinking density among the difunctional to hexafunctional thiol compounds is used, an improving effect of the breaking elongation is large, and it tends to be reduced as the number of the mercapto group in a molecule is increased to 4 (tetrafunctional), 6 (hexafunctional).

Also, in general, if an inter-crosslinking point molecular weight is increased, a compression set (C.S.) is deteriorated. In the present invention, however, since an energy ray-curing system of an ene-thiol base is employed, the compression set can be inhibited from being deteriorated to a large extent even if the inter-crosslinking point molecular weight is increased. A measuring method for C.S. is described in the example.

Energy Ray-Curing System of an Ene-thiol Base:

In the energy ray-curable elastomer composition of the present invention, employed is the energy ray-curing system of an ene-thiol base in which the (meth)acryloyl group-containing energy ray-curable compound of the component (A) and the difunctional to hexafunctional thiol compounds of the component (B) participate. Also, in the energy ray-curable material of the present invention for a gasket, employed is the energy ray-curing system of an ene-thiol base in which the (meth)acryloyl group-containing energy ray-curable compound of the component (A), the difunctional to hexafunctional thiol compounds of the component (B) and the (meth) acrylate monomer participate.

Before explaining the above energy ray-curing system of an ene-thiol base, general radical polymerization of a (meth) acryloyl group-containing compound and a reaction mechanism of an energy ray-curing system of an ene-thiol base shall be explained.

(1) Radical Polymerization of a (meth)acryloyl Group-Containing Compound and a Reaction Mechanism of an Energy Ray-Curing System of an Ene-thiol Base:

A crosslinking reaction carried out by irradiation with a UV ray in a system in which a difunctional (meth)acryloyl group-containing oligomer and a monofunctional (meth) acryloyl group-containing monomer are used as the (meth) acryloyl group-containing compound and in which a radical photo-polymerization initiator is used is a chain reaction, and the polymerization proceeds according to steps shown in the following scheme 1:

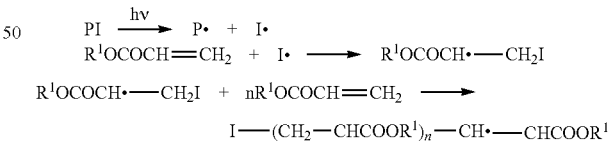

$R^1$ in the scheme described above represents an organic group.

First, a photo-polymerization initiator (PI) excited by irradiation with a UV ray is cleaved to produce a radical, and this radical attacks the acryloyl group, whereby the excited end is transferred (initiation reaction) to allow the polymerization to proceed while the oligomer and the monomer are reacted one after the other with the excited ends (growing reaction). The explanations of a termination reaction and a chain reaction shall be omitted.

On the other hand, the reaction of ene with thiol is a successive reaction as shown in the following scheme 2:

<Scheme 2>

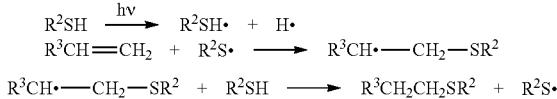

$R^2$ and $R^3$ in the scheme described above each represent an organic group.

First, thiol excited by irradiation with a UV ray discharges a hydrogen radical to form a thiol radical, and this thiol radical is reacted with ene and then draws a hydrogen atom from another thiol to terminate the reaction.

When a UV ray curing system of a radical polymerization base and an ene-thiol base system are used in combination, the polymerization of the acryloyl group-containing compounds themselves and the reaction of the acryloyl group-containing compound with the thiol proceed almost at the same time. The reaction speed is faster in the reaction of the ene with the thiol in many cases, but it is not so fast that a digit thereof is changed. In a part with which the thiol is reacted, the acryloyl group-containing compound is not polymerized therewith any more, and therefore comparison of a cured substance of only the acryloyl group-containing compound with a cured substance obtained by using the ene-thiol base system in combination results in showing that a polymerization chain is shorter in the cured substance obtained by using the ene-thiol base system in combination. Thus, when the polymerization chain gets shorter, an effect of inhibiting a micro gel (a hard part in the elastomer) from being formed can be expected.

From the matters described above, it can be found that combined use of the ene-thiol base system provides an effect of enhancing a flexibility of the cured substance.

(2) Increasing Mechanism of Enter-Crosslinking Point Molecular Weight by Reaction of Difunctional Acrylate Oligomer with Polythiol Compound:

Next, an increasing mechanism of the inter-crosslinking point molecular weight Mc shall be explained by referring to an example in which a difunctional urethane base acrylate oligomer is used as the difunctional (meth)acrylate oligomer and in which a difunctional thiol compound is used as the polythiol compound. The above reaction proceeds according to the following scheme 3:

<Scheme 3>

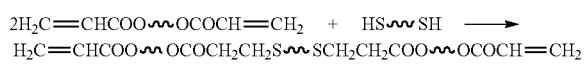

When two molecules of the difunctional urethane base acrylate oligomer are reacted with one molecule of the difunctional thiol compound, one new oligomer in which a molecular chain is extended, as show in the scheme 3 shown above, is formed. That is, adding the polythiol compound makes it possible to extend the oligomer chain in a reaction step without changing a molecular weight of the difunctional urethane base acrylate oligomer used.

After that, polymerization of the difunctional urethane base acrylate oligomer in which a molecular chain is extended proceeds, and an elastomer-cured substance having a large inter-crosslinking point molecular weight is obtained.

When tetrafunctional and hexafunctional polythiol compounds are used as the polythiol compound, parts which are usually crosslinking points are present in the structures of the above polythiol compounds, and therefore an increase in the inter-crosslinking point molecular weight is small as compared with the difunctional thiol compound. However, when the tetrafunctional and hexafunctional polythiol compounds are reacted with the urethane base acrylate oligomer, a star branch oligomer having a long side chain is formed, whereby this part works as a soft segment in the elastomer-cured substance, and as a result thereof, the above elastomer composition is considered to be increased in a breaking elongation as is the case with an instance in which the inter-crosslinking point molecular weight is increased.

Applications of Energy Ray-Curable Elastomer Composition:

In the energy ray-curable elastomer composition of the present invention, employing the energy ray-curing system of an ene-thiol base makes it possible to increase an inter-crosslinking point molecular weight of the cured substance without changing the kind of the energy ray-curable compound before cured and provide the elastomer-cured substance in which a braking elongation is compatible with a processability.

The above elastomer-cured substance can be expected to be used for applications including, for example, a gasket for HDD, a sealing member for ink tanks, a sealing member for various display devices, a sealing member for structures in construction, civil engineering and the like, a packing member such as o rings and the like, a vibration-proof material and the like.

Further, the above elastomer composition can be expected to be used for applications such as an adhesive for plastics themselves, for example, an adhesive for an optical sticking disk adhering disk members themselves in which informations are optically recorded or adhering a disk member in which informations are recorded with a different disk member having the same form so that the informations can be reproduced and applications such as an ink composition for ink jet recording.

Applications of Gasket:

The gasket of the present invention is suitably used as a gasket for HDD in terms of a member provided with a gasket layer and can be used, in addition thereto, for applications including a sealing member for ink tanks, a sealing member for various display devices, a sealing member for structures in construction, civil engineering and the like, a packing member such as o rings and the like, a vibration-proof material and the like.

Further, the present invention provides as well a hard disk device prepared by using the gasket of the present invention described above.

EXAMPLES

Next, the present invention shall be explained in further details with reference to examples, but the present invention shall by no means be restricted by these examples.

Various characteristic in the respective examples were determined according to methods shown below.

(1) Inter-Crosslinking Point Molecular Weight Mc:

The inter-crosslinking point molecular weights Mc of the elastomer-cured substance and the gasket were calculated according to the equation of Flory-Rehner described in the present specification. The volume expansion coefficient in the equation was measured by the following method.

Volume Expansion Coefficient:

The sample piece of 25×12×2 mm was dipped in 50 mL of toluene for 24 hours, and a volume expansion coefficient thereof was determined by measuring the dimensions thereof before and after dipping.

(2) Tensile Test:

The elastomer-cured substance sheet or the gasket having a thickness of 2 mm which was punched in the form of a DIN 3 dumbbell was subjected to a tensile test on the conditions of test temperatures of 23° C. and 80° C. and a tensile speed of 200 mm/minute according to JIS K 6251 by means of a tensile test equipment (trade name: "Tensilon RTC-1225A", manufactured by ORIENTEC Co., Ltd.) to measure a fracture strength Tb, a breaking elongation Eb and a 100% elongation stress.

(3) Compression Set (C.S.):

Five sheets of the elastomer-cured substance sheet or the gasket having a thickness of 2 mm which was cut to 2 cm square were superposed to prepare a sample for measurement, and a compression set thereof was measured on the condition of a test temperature of 70° C. according to JIS K 6262.

(4) Hardness:

A hardness of the cured substance of the material for a gasket was measured by means of a type A durometer according to JIS K 6253. A sheet having a thickness of about 6 mm which was prepared by laminating five sheets of the cured substance having a thickness of about 2 mm was used as the test substance.

(5) Tan δ:

A viscoelasticity measuring equipment (trade name: "Rheometics", manufactured by TA Instruments Japan, Inc.) was used to measure tan δ (loss tangent) at a temperature of 85° C. in the cured substance of the material for a gasket on the conditions of a frequency of 1 Hz, a distortion of 1% and a heating rate of 3° C./minute from −50° C. to 100° C.

(6) Compression Heat Shock Test:

A sheet of the cured substance of the material for a gasket having a thickness of 2 mm was cut to 2 cm square, and eight sheets thereof were superposed to prepare a sample for a test. The sample was compressed by about 50% by means of a 7.5 mm spacer, and it was subjected to a heat shock test of 100 cycles in which 30 minutes at −40° C.⇔ 30 minutes at 85° C. was set to one cycle by means of a heat shock test equipment ("THERMAL SHOCK CHAMBER NT1020", manufactured by Kusumoto Chemicals Co. Ltd.) to visually confirm the presence of breakage, wherein the sample in which breakage was confirmed was marked with X, and the sample in which breakage was not confirmed was marked with ○.

(7) Gasket Heat Shock Test:

The material for a gasket was used to form a coating film of a first stage on an aluminum plate on which nickel was plated, and then a coating film of a second stage was formed thereon by using the same material for a gasket so that a whole thickness was 1.1 mm. Thereafter, the above coating films were cured by irradiating with a UV ray (using "Light Hammer 6", manufactured by Fusion UV Systems Japan, Inc.) on the conditions of an illuminance of 700 mW/cm$^2$ and an integrated luminous energy of 10,000 mJ/cm$^2$ to prepare a member provided with a gasket layer.

Next, a pressure of a compression rate 40% was applied onto the gasket of the above member provided with a gasket layer, and it was subjected to a heat shock test of 100 cycles in one cycle of 30 minutes at −40° C.⇔ 30 minutes at 85° C. to visually confirm the presence of breakage in the above gasket, wherein the sample in which breakage was confirmed was marked with X, and the sample in which breakage was not confirmed was marked with ○.

(8) Viscosity of Material for a Gasket at a Temperature of 50° C. and a Shear Rate of 1.0/Second:

Measured by means of a rheometer "RS-600", manufactured by Haake A.G. The material for a gasket was controlled to 50° C., and a shear stress thereof was measured at a gap of 0.2 mm while changing a shear rate in a range of 1 to 10 s$^{-1}$ to draw an approximate line from a Casson plot obtained by plotting values obtained by ½ multiplying of a shear rate and a stress by a least square method to calculate a viscosity at 1 s$^{-1}$.

Examples 1 to 6 and Comparative Examples 1 and 2

A UV ray-curable elastomer composition having a blend composition shown in Table 1 was prepared to form an elastomer-cured substance sheet according to a method shown below, and it was cut to forms used in the respective tests.

First, two glass plates of 15 cm×15 cm×3 mm and two die-releasable polyethylene terephthalate (PET) films of 15 cm×15 cm×0.06 mm were prepared.

The UV ray-curable elastomer composition obtained above was interposed between the die-releasable PET films while maintaining a prescribed thickness by a spacer, and it was further interposed between the glass plates. Then, the elastomer composition described above was cured by irradiating with a UV ray (used were a UV ray irradiation equipment "UV1501BA-LT" manufactured by Sen Engineering Co., Ltd. and a metal halide lamp "SE-1500M" manufactured by the same company) at a temperature of 23° C. on the conditions of an illuminance of 150 mW/cm$^2$ and an irradiation time of 60 seconds.

Then, the elastomer-cured substance sheet was peeled off from the glass plates and the die-releasable PET films and subjected to annealing treatment at 120° C. for 4 hours, and then it was cut to forms used in the respective tests and used for measuring various characteristics. The measuring results of the various characteristics are shown in Table 1. All of the UV ray-curable elastomer compositions used in Examples 1 to 6 and Comparative Examples 1 and 2 had a suited viscosity at room temperature and were homogeneous compositions.

TABLE 1

|  |  | Comparative Example | | Example | | | | | |
|---|---|---|---|---|---|---|---|---|---|
|  |  | 1 | 2 | 1 | 2 | 3 | 4 | 5 | 6 |
| Blend composition | COCH=$CH_2$ group/SH group | 100/0 | 100/50 | 100/5 | 100/7.5 | 100/10 | 100/15 | 100/20 | 100/30 |
|  | Energy ray-curable oligomer A[1] (mass part) | 100 | 100 | 100 | 100 | 100 | 100 | 100 | 100 |
|  | Hexafunctional polythiol compound[2] (mass part) | 0 | 10.8 | 1.08 | 1.62 | 2.16 | 3.24 | 4.32 | 6.48 |
| Characteristic value | Inter-crosslinking point molecular weight Mc (g/mol) | 3259 | Incalculable | 4893 | 6438 | 7408 | 10814 | 13328 | 35983 |
| Tensile test at 23° C. | Tb (MPa) | 7.13 | 0.05 | 6.22 | 4.98 | 3.26 | 3.00 | 1.61 | 0.48 |
|  | Eb (%) | 270 | Fluidity broken | 335 | 385 | 420 | 550 | 605 | 775 |
| Tensile test at 80° C. | Tb (MPa) | 0.98 | Unmeasurable | 0.71 | 0.63 | 0.58 | 0.50 | 0.35 | 0.17 |
|  | Eb (%) | 148 | Unmeasurable | 159 | 179 | 198 | 306 | 338 | 619 |
|  | Compression set [70° C.] (%) | 1 | Unmeasurable | 2 | 2 | 2 | 7 | 15 | 31 |

Remarks:
[1] Energy ray-curable oligomer A: trade name "Litetac PUA- KH32M" (mixture of a difunctional urethane base acrylate oligomer, isobornyl acrylate, phenoxyethyl acrylate and Irgacure 2959 (photo-polymerization initiator)), manufactured by Kyoeisha Chemical Co., Ltd.
[2] Hexafunctional thiol compound: trade name "DPMP", dipentaerythritol hexa(β-mercaptopropionate), manufactured by SC Organic Chemical Co., Ltd.

Examples 7 to 10 and Comparative Example 3

A UV ray-curable elastomer composition having a blend composition shown in Table 2 was prepared. Hereinafter, the same operations as in Examples 1 to 6 and Comparative Examples 1 and 2 were carried out, and the elastomer-cured substance sheet was cut to forms used in the respective tests and used for measuring various characteristics. The measuring results of the various characteristics are shown in Table 2 together with those of Comparative Example 1. All of the UV ray-curable elastomer compositions used in Examples 7 to 10 and Comparative Example 3 had a suited viscosity at room temperature and were homogeneous compositions.

TABLE 2

|  |  | Comparative Example | | Example | | | |
|---|---|---|---|---|---|---|---|
|  |  | 1 | 3 | 7 | 8 | 9 | 10 |
| Blend composition | COCH=$CH_2$ group/SH group | 100/0 | 100/30 | 100/5 | 100/10 | 100/15 | 100/20 |
|  | Energy ray-curable oligomer A[1] (mass part) | 100 | 100 | 100 | 100 | 100 | 100 |
|  | Tetrafunctional polythiol compound[3] (mass part) | 0 | 6.06 | 1.01 | 2.02 | 3.03 | 4.04 |
| Characteristic value | Inter-crosslinking point molecular weight Mc (g/mol) | 3259 | Incalculable | 6489 | 13244 | 24413 | 50972 |
| Tensile test at 23° C. | Tb (MPa) | 7.13 | 0.03 | 4.69 | 1.88 | 0.78 | 0.44 |
|  | Eb (%) | 270 | Fluidity broken | 400 | 535 | 645 | 955 |
| Tensile test at 80° C. | Tb (MPa) | 0.98 | Unmeasurable | 0.57 | 0.42 | 0.30 | 0.10 |
|  | Eb (%) | 148 | Unmeasurable | 175 | 267 | 471 | 750< |
|  | Compression set [70° C.] (%) | 1 | Unmeasurable | 2 | 9 | 25 | 55 |

Remarks:
[1] Same as the remark in Table 1
[3] tetrafunctional thiol compound: trade name "PEMP", pentaerythritol tetra(β-mercaptopropionate), manufactured by SC Organic Chemical Co., Ltd.

Examples 11 to 13

A UV ray-curable elastomer composition having a blend composition shown in Table 3 was prepared. Hereinafter, the same operations as in Examples 1 to 6 and Comparative Examples 1 and 2 were carried out, and the elastomer-cured substance sheet was cut to forms used in the respective tests and used for measuring various characteristics. The measuring results of the various characteristics are shown in Table 3 together with those of Comparative Example 1. All of the UV ray-curable elastomer compositions used in Examples 11 to 13 had a suited viscosity at room temperature and were homogeneous compositions.

TABLE 3

| | | Comparative Example | Example | | |
|---|---|---|---|---|---|
| | | 1 | 11 | 12 | 13 |
| Blend composition | COCH=CH$_2$ group/SH group | 100/0 | 100/2 | 100/5 | 100/10 |
| | Energy ray-curable oligomer A[1)] (mass part) | 100 | 100 | 100 | 100 |
| | Difunctional polythiol Compound[4)] (mass part) | 0 | 0.62 | 1.55 | 3.10 |
| Characteristic value | Inter-crosslinking point molecular weight Mc (g/mol) | 3259 | 5561 | 9861 | 31928 |
| | Tensile test at 23° C. Tb (MPa) | 7.13 | 5.14 | 3.34 | 0.64 |
| | Eb (%) | 270 | 360 | 525 | 875 |
| | Tensile test at 80° C. Tb (MPa) | 0.98 | 0.83 | 0.53 | 0.18 |
| | Eb (%) | 148 | 202 | 282 | 548 |
| | Compression set [70° C.] (%) | 1 | 2 | 8 | 48 |

Remarks:
[1)]Same as the remark in Table 1
[4)]Difunctional thiol compound: trade name "EGMP 4", tetraethylene glycol di(β-mercaptopropionate), manufactured by SC Organic Chemical Co., Ltd.

Comparative Example 4

A UV ray-curable elastomer composition was prepared in the same manner as in Example 1, except that an oligomer having a molecular weight which was about double as large as that of the urethane base acrylate oligomer (difunctional) in Litetac PUA-KH32M (described above) was used as the energy ray-curable oligomer. The above energy ray-curable oligomer showed a starch syrup form at room temperature and was very inferior in a handling property. Also, the UV ray-curable elastomer composition had a high viscosity, and the homogeneous composition was not obtained.

Hereinafter, the same operations as in Examples 1 to 6 and Comparative Examples 1 and 2 were carried out, and the elastomer-cured substance sheet was cut to forms used in the respective tests and used for measuring various characteristics. The measuring results of the various characteristics are shown below.

Inter-crosslinking point molecular weight Mc=12585
Tensile test at 23° C.:
Tb=3.52 MPa
Eb=533%
Compression set [70° C.]=14.3%

Examples 14 to 19 and Comparative Examples 4 and 5

A UV ray-curable material for a gasket having a blend composition shown in Table 4 was prepared, and a sheet of a cured substance of the material for a gasket was prepared according to a method shown below and cut to forms used in the respective tests.

First, two glass plates of 15 cm×15 cm×3 mm and two die-releasable polyethylene terephthalate (PET) films of 15 cm×15 cm×0.06 mm were prepared.

The UV ray-curable material for a gasket obtained above was interposed between the die-releasable PET films while maintaining a prescribed thickness by a spacer, and it was further interposed between the glass plates. Then, the material for a gasket described above was cured by irradiating with a UV ray (used were the UV ray irradiation equipment "UV1501BA-LT" manufactured by Sen Engineering Co., Ltd. and the metal halide lamp "SE-1500M" manufactured by the same company) on the conditions of an illuminance of 150 mW/cm$^2$ and an irradiation time of 60 seconds.

Then, the sheet of the cured substance of the material for a gasket was peeled off from the glass plates and the die-releasable PET films and subjected to annealing treatment at 120° C. for 4 hours, and then it was cut to forms used in the respective tests and used for measuring various characteristics. The measuring results of the various characteristics are shown in Table 4. All of the UV ray-curable materials for a gasket used in Examples 14 to 19 and Comparative Examples 4 and 5 had a suited viscosity at room temperature and were homogeneous compositions.

TABLE 4

| | Comparative Example | | Example | | | | | |
|---|---|---|---|---|---|---|---|---|
| | 4 | 5 | 14 | 15 | 16 | 17 | 18 | 19 |
| COCH=CH$_2$ group/SH group (functional group number ratio) | 100/0 | 100/50 | 100/5 | 100/7.5 | 100/10 | 100/15 | 100/20 | 100/30 |

TABLE 4-continued

|  |  | Comparative Example | | Example | | | | | |
| --- | --- | --- | --- | --- | --- | --- | --- | --- | --- |
|  |  | 4 | 5 | 14 | 15 | 16 | 17 | 18 | 19 |
| Blend composition | Energy ray-curable oligomer A[1] (mass part) | 100 | 100 | 100 | 100 | 100 | 100 | 100 | 100 |
|  | Hexafunctional polythiol compound[2] (mass part) | 0 | 10.8 | 1.08 | 1.62 | 2.16 | 3.24 | 4.32 | 6.48 |
|  | Thickener[3] (mass part) | 3 | 3 | 3 | 3 | 3 | 3 | 3 | 3 |
|  | Additive[4] (mass part) | 1 | 1 | 1 | 1 | 1 | 1 | 1 | 1 |
| Characteristic value | Inter-crosslinking point molecular weight Mc (g/mol) | 3259 | Incalculable | 4893 | 6438 | 7408 | 10814 | 13328 | 35983 |
|  | Hardness (degree) | 30.4 | Unmeasurable | 26.0 | 23.2 | 20.0 | 17.4 | 13.2 | 5.2 |
|  | Tensile test at 23° C.   100% elongation stress (MPa) | 0.68 | 0.04 | 0.48 | 0.41 | 0.38 | 0.26 | 0.21 | 0.12 |
|  | Breaking strength Tb (MPa) | 7.13 | 0.05 | 6.22 | 4.98 | 3.26 | 3.00 | 1.61 | 0.48 |
|  | Breaking elongation Eb (%) | 270 | Fluidity broken | 335 | 385 | 420 | 550 | 605 | 775 |
|  | Tensile test at 80° C.   100% elongation stress (MPa) | 0.63 | Unmeasurable | 0.46 | 0.36 | 0.32 | 0.19 | 0.12 | 0.04 |
|  | Breaking strength Tb (MPa) | 0.98 | Unmeasurable | 0.71 | 0.63 | 0.58 | 0.50 | 0.35 | 0.17 |
|  | Breaking elongation Eb (%) | 148 | Unmeasurable | 159 | 179 | 198 | 306 | 338 | 619 |
|  | 85° C. tan δ | 0.01 | 1.94 | 0.06 | 0.07 | 0.08 | 0.13 | 0.20 | 0.50 |
|  | 70° C. compression set (%) | 1 | — | 2 | 3 | 6 | 8 | 11 | 42 |
|  | Heat shock test   Cured substance of material for gasket (50% compressed) | X | ○ | ○ | ○ | ○ | ○ | ○ | ○ |
|  | Viscosity of material for gasket (50° C., shear rate 1.0/second) (Pa·s) | 150 | 150 | 150 | 150 | 150 | 150 | 150 | 150 |

Remarks:
[1] Energy ray-curable oligomer A: trade name "Litetac PUA-KH32M" (mixture of a difunctional urethane base acrylate oligomer, isobornyl acrylate, phenoxyethyl acrylate and Irgacure 2959 (photo-polymerization initiator)), manufactured by Kyoeisha Chemical Co., Ltd.
[2] Hexafunctional thiol compound: trade name "DPMP", dipentaerythritol hexa(β-mercaptopropionate), manufactured by SC Organic Chemical Co., Ltd.
[3] Organic thickener: trade name "ADVITROL 100", manufactured by Sud Chemie Catalysts Japan, Inc.
[4] Additive: carbodiimide, trade name "Elastostab H01", manufactured by Nisshin Spinning Co., Ltd.

Examples 20 to 23 and Comparative Example 6

A UV ray-curable material for a gasket having a blend composition shown in Table 5 was prepared. Hereinafter, the same operations as in Examples 14 to 19 and Comparative Examples 4 and 5 were carried out, and the sheet of the cured substance of the material for a gasket was cut to forms used in the respective tests and used for measuring various characteristics. The measuring results of the various characteristics are shown in Table 5 together with those of Comparative Example 4. All of the UV ray-curable materials for a gasket used in Examples 20 to 23 and Comparative Example 6 had a suited viscosity at room temperature and were homogeneous compositions.

TABLE 5

|  |  | Comparative Example | | Example | | | |
| --- | --- | --- | --- | --- | --- | --- | --- |
|  |  | 4 | 6 | 20 | 21 | 22 | 23 |
|  | COCH=CH₂ group/SH group (functional group number ratio) | 100/0 | 100/30 | 100/5 | 100/10 | 100/15 | 100/20 |
| Blend composition | Energy ray-curable oligomer A[1] (mass part) | 100 | 100 | 100 | 100 | 100 | 100 |
|  | Tetrafunctional polythiol compound[5] (mass part) | 0 | 6.06 | 1.01 | 2.02 | 3.03 | 4.04 |
|  | Thickener[3] (mass part) | 3 | 3 | 3 | 3 | 3 | 3 |
|  | Additive[4] (mass part) | 1 | 1 | 1 | 1 | 1 | 1 |
| Characteristic value | Inter-crosslinking point molecular weight Mc (g/mol) | 3259 | Incalculable | 6489 | 13244 | 24413 | 50972 |
|  | Hardness (degree) | 30.4 | Unmeasurable | 22.2 | 15.2 | 10.0 | 5.6 |
|  | Tensile test at 23° C.   100% elongation stress (MPa) | 0.68 | 0.03 | 0.41 | 0.27 | 0.16 | 0.10 |
|  | Breaking strength Tb (MPa) | 7.13 | 0.03 | 4.69 | 1.88 | 0.78 | 0.44 |
|  | Breaking elongation Eb (%) | 270 | Fluidity broken | 400 | 535 | 645 | 955 |
|  | Tensile test at 80° C.   100% elongation stress (MPa) | 0.63 | Unmeasurable | 0.34 | 0.18 | 0.07 | 0.01 |
|  | Breaking strength Tb (MPa) | 0.98 | Unmeasurable | 0.57 | 0.42 | 0.30 | 0.10 |
|  | Breaking elongation Eb (%) | 148 | Unmeasurable | 175 | 267 | 471 | 750< |
|  | 85° C. tan δ | 0.01 | 1.91 | 0.07 | 0.15 | 0.32 | 0.69 |
|  | 70° C. compression set (%) | 1 | Unmeasurable | 2 | 9 | 25 | 55 |
|  | Heat shock test   Cured substance of material for gasket (50% compressed) | X | ○ | ○ | ○ | ○ | ○ |
|  | Gasket | X | ○ | ○ | ○ | ○ | ○ |
|  | Viscosity of material for gasket (50° C., shear rate 1.0/second) (Pa·s) | 150 | 150 | 150 | 150 | 150 | 150 |

Remarks:
[1], [3] and [4] Same as the remarks in Table 4
[5] tetrafunctional thiol compound: trade name "PEMP", pentaerythritol tetra(β-mercaptopropionate), manufactured by SC Organic Chemical Co., Ltd.

Examples 24 to 26

A UV ray-curable material for a gasket having a blend composition shown in Table 6 was prepared. Hereinafter, the same operations as in Examples 14 to 19 and Comparative Examples 4 and 5 were carried out, and the sheet of the cured substance of the material for a gasket was cut to forms used in the respective tests and used for measuring various characteristics. The measuring results of the various characteristics are shown in Table 6 together with those of Comparative Example 4. All of the UV ray-curable materials for a gasket used in Examples 24 to 26 had a suited viscosity at room temperature and were homogeneous compositions.

TABLE 6

|  |  | Comparative Example | Example | | |
|---|---|---|---|---|---|
|  |  | 4 | 24 | 25 | 26 |
| Blend composition | COCH=CH$_2$ group/SH group (functional group number ratio) | 100/0 | 100/2 | 100/5 | 100/10 |
|  | Energy ray-curable oligomer A[1] (mass part) | 100 | 100 | 100 | 100 |
|  | Difunctional polythiol compound[6] (mass part) | 0 | 0.62 | 1.55 | 3.10 |
|  | Thickener[3] (mass part) | 3 | 3 | 3 | 3 |
|  | Additive[4] (mass part) | 1 | 1 | 1 | 1 |
| Characteristics value | Inter-crosslinking point molecular weight Mc (g/mol) | 3259 | 5561 | 9861 | 31928 |
|  | Hardness (degree) | 30.4 | 25.4 | 17.6 | 6.4 |
| Tensile test at 23° C. | 100% elongation stress (MPa) | 0.68 | 0.46 | 0.28 | 0.11 |
|  | Breaking strength Tb (MPa) | 7.13 | 5.14 | 3.34 | 0.64 |
|  | Breaking elongation Eb (%) | 270 | 360 | 525 | 875 |
| Tensile test at 80° C. | 100% elongation stress (MPa) | 0.63 | 0.41 | 0.20 | 0.05 |
|  | Breaking strength Tb (MPa) | 0.98 | 0.83 | 0.53 | 0.18 |
|  | Breaking elongation Eb (%) | 148 | 202 | 282 | 548 |
|  | 85° C. tan δ | 0.01 | 0.06 | 0.14 | 0.49 |
|  | 70° C. compression set (%) | 1 | 4 | 10 | 48 |
| Heat shock test | Cured substance of material for gasket (50% compressed) | X | ○ | ○ | ○ |
|  | Viscosity of material for gasket (50° C., shear rate 1.0/second) (Pa·s) | 150 | 150 | 150 | 150 |

Remarks:
[1], [3] and [4]Same as the remarks in Table 4
[6]Difunctional thiol compound: trade name "EGMP4", tetraethylene glycol di(β-mercaptopropionate), manufactured by SC Organic Chemical Co., Ltd.

Comparative Example 7

A UV ray-curable material for a gasket containing 75 parts by mass of Litetac PUA-KH32M (described above) (difunctional urethane base acrylate oligomer), 10 parts by mass of IBXA, 15 parts by mass of PO-A, 2 parts by mass of Irgacure 2959 (manufactured by Ciba Specialty Chemicals K.K.), 3 parts by mass of the thickener[3] (described above) and 1 part by mass of the additive[4] (described above) was prepared as the energy ray-curable oligomer. The difunctional urethane base acrylate oligomer described above showed a starch syrup form at room temperature and was very inferior in a handling property. Also, the UV ray-curable material for a gasket had a high viscosity, and the homogeneous material was not obtained. Two stage writing on a 2.5 inch HDD cover plate was impossible.

INDUSTRIAL APPLICABILITY

The elastomer-cured substance of the energy ray-curable elastomer composition of the present invention is useful for applications including a gasket for HDD, a sealing member for ink tanks, a sealing member for various display devices, a sealing member for structures in construction, civil engineering and the like, a packing member such as o rings and the like, a vibration-proof material, various adhesives and the like. Also, the gasket which is the cured substance of the material for a gasket according to the present invention is useful for applications such as a gasket for HDD and the like.

What is claimed is:

1. A material for a gasket containing
   (A) an energy ray-curable compound having a (meth)acryloyl group,
   (B) a polythiol compound having 6 mercapto groups in a molecule, and
   (D) a monofunctional (meth)acrylate monomer having a molecular weight of less than 1,000,
   wherein a functional group number ratio of the (meth)acryloyl group in the above composition to the mercapto group in the component (B) is 100:0.1 to 100:5n,
   wherein n is the number of the mercapto group in a molecule of the polythiol compound,
   wherein the component (A) is an energy ray-curable liquid oligomer having a (meth)acryloyl group, and a cured substance obtained by irradiation with an energy ray has an inter-crosslinking point molecular weight Mc falling in a range of 6,000 to 55,000 which is calculated from an equation of Flory-Rehner, and
   wherein the energy ray-curable oligomer (A) having a (meth)acryloyl group is a difunctional urethane base (meth)acrylate oligomer having two (meth)acryloyl groups in a molecule.

2. The material for a gasket according to claim 1, wherein a viscosity at a temperature of 50° C. and a shear rate of 1.0/second is 1 to 10,000 Pa·s.

3. The material for a gasket according to claim 1, wherein a content of the (meth)acrylate monomer (D) is 5 to 40 parts by mass based on 100 parts by mass of the component (A).

4. The material for a gasket according to claim 1, wherein a content of the polythiol compound (B) having 6 mercapto groups in a molecule is 0.5 to 7 parts by mass based on 100 parts by mass of the component (A).

5. The material for a gasket according to claim 1, wherein the polythiol compound (B) having 6 mercapto groups in a molecule is β-mercaptopropionic acid ester or β-mercaptobutanoic acid ester of polyhydric alcohol having 2 to 6 hydroxyl groups.

6. The material for a gasket according to claim 5, wherein the polyhydric alcohol having 2 to 6 hydroxyl groups is alkanediol having 2 to 20 carbon atoms, poly(oxyalkylene) glycol, glycerol, diglycerol, trimethylolpropane, ditrimethylolpropane, pentaerythritol or dipentaerythritol.

7. The material for a gasket according to claim 1, wherein the energy ray is a UV ray, and (C) a radical photo-polymerization initiator is contained.

8. The material for a gasket according to claim 7, wherein the radical photo-polymerization initiator (C) is an intramolecular cleavage type and/or a hydrogen drawing type.

9. A gasket prepared by curing the material for a gasket according to claim 1 by irradiation with an energy ray.

10. The gasket according to claim 9, wherein it has a hardness of 5 to 50 degrees measured by means of a type A durometer according to JIS K 6253.

11. A hard disk device prepared by using the gasket according to claim 9.

12. The material for a gasket according to claim 1, further comprising an organic thickener.

13. The material for a gasket according to claim 12, wherein the organic thickener is selected from the group consisting of hydrogenated castor oil and higher amide wax which is a compound obtained by substituting hydrogen of ammonia with an acyl group.

14. The material for a gasket according to claim 1, wherein the material further contains an inorganic filler.

15. The material for a gasket according to claim 13, wherein the material further contains an inorganic filler.

16. The material for a gasket according to claim 14, wherein the inorganic filler is silica powder, silica powder subjected to hydrophobic treatment, or a mixture thereof.

17. The material for a gasket according to claim 15, wherein the inorganic filler is silica powder, silica powder subjected to hydrophobic treatment, or a mixture thereof.

18. The material for a gasket according to claim 14, wherein the inorganic filler has an average particle diameter of 5 to 12 μm.

19. The material for a gasket according to claim 15, wherein the inorganic filler has an average particle diameter of 5 to 12 μm.

20. The material for a gasket according to claim 16, wherein the inorganic filler has an average particle diameter of 5 to 12 μm.

21. The material for a gasket according to claim 17, wherein the inorganic filler has an average particle diameter of 5 to 12 μm.

* * * * *